United States Patent
Xia et al.

(10) Patent No.: US 12,468,641 B2
(45) Date of Patent: Nov. 11, 2025

(54) READ/WRITE OPERATION EXECUTION METHOD AND SOC CHIP

(71) Applicant: Huawei Technologies Co., Ltd., Shenzhen (CN)

(72) Inventors: Jing Xia, Shenzhen (CN); Hengchao Xin, Shenzhen (CN); Zhuonan Li, Shenzhen (CN); Sirui Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/477,110

(22) Filed: Sep. 28, 2023

(65) Prior Publication Data

US 2024/0028528 A1 Jan. 25, 2024

Related U.S. Application Data

(63) Continuation of application No. PCT/CN2021/084556, filed on Mar. 31, 2021.

(51) Int. Cl.
*G06F 13/16* (2006.01)

(52) U.S. Cl.
CPC ...... *G06F 13/1668* (2013.01); *G06F 13/1642* (2013.01); *G06F 13/1663* (2013.01)

(58) Field of Classification Search
None
See application file for complete search history.

(56) References Cited

U.S. PATENT DOCUMENTS

| 2003/0145136 A1* | 7/2003 | Tierney | G06F 13/1663 712/E9.048 |
| 2005/0289306 A1 | 12/2005 | Muthrasanallur et al. | |
| 2019/0303326 A1* | 10/2019 | Desai | G06F 9/466 |

FOREIGN PATENT DOCUMENTS

| CN | 103858117 A | * | 6/2014 | G06F 13/362 |
| CN | 106055504 B | * | 8/2019 | G06F 13/4027 |

* cited by examiner

*Primary Examiner* — Brian R Peugh
(74) *Attorney, Agent, or Firm* — Slater Matsil, LLP

(57) ABSTRACT

This application discloses a read/write operation execution method and a SoC chip. The read/write operation execution method includes: A first node receives a first message and a second message from a second node, where the first message is for requesting to perform a read/write operation on a first address managed by a third node, the second message is for requesting to perform a read/write operation on a second address managed by the third node, an execution sequence constraint of the read/write operation of the second node is stricter than an execution sequence constraint of the read/write operation of the third node; the first node obtains operation permission of the first address and operation permission of the second address from the third node; and the first node performs read/write operations on the first address and the second address.

18 Claims, 16 Drawing Sheets

READ/WRITE OPERATION EXECUTION METHOD AND SOC CHIP

CROSS-REFERENCE TO RELATED APPLICATIONS

This application is a continuation of International Application No. PCT/CN2021/084556, filed on Mar. 31, 2021, the disclosure of which is hereby incorporated by reference in its entirety.

TECHNICAL FIELD

This application relates to the storage field, and in particular, to a read/write operation execution method and a system on chip (SoC) chip.

BACKGROUND

A plurality of processes (software) may transfer data by accessing a shared memory. Specifically, the plurality of processes send a read/write command to hardware (for example, a central processing unit (CPU)), and the hardware performs read/write operations on the shared memory. A sequence of the read/write operations performed by the hardware affects a final execution result viewed by the software. Therefore, a memory consistency model can be used for putting forward different requirements on the execution sequence of the read/write operations, to ensure that the execution result meets an expectation of the software.

Different memory consistency models require different execution sequence strictness. When a node of a memory consistency model (strong order model for short) that complies with a strict order (SO) constraint requests a read/write operation from a node of a memory consistency model (weak order model for short) that complies with a relax order (RO) constraint, the node of the strong order model also needs to perform the read/write operation in the weak order model based on an execution sequence of the strong order model, to ensure that a sequence of globally observable (GO) execution results meets a requirement of the strong order model.

SUMMARY

Embodiments of this application provide a read/write operation execution method and a SoC chip, so that a sequence of globally observable execution results of performing a read/write operation by a node that complies with an RO constraint meets a requirement of a node that complies with an SO constraint.

To achieve the foregoing objectives, the following technical solutions are used in embodiments of this application.

According to a first aspect, a read/write operation execution method is provided, including: A first node receives a first message and a second message from a second node, where the first message is for requesting to perform a read/write operation on a first address managed by a third node, the second message is for requesting to perform a read/write operation on a second address managed by the third node, and an execution sequence constraint of the read/write operation of the second node is stricter than an execution sequence constraint of the read/write operation of the third node; the first node obtains operation permission of the first address and operation permission of the second address from the third node; and the first node performs read/write operations on the first address and the second address.

According to the read/write operation execution method provided in this embodiment of this application, the first node receives the first message and the second message from the second node, the second node complies with an SO constraint, the first message requests to perform the read/write operation on the first address managed by the third node, the second message requests to perform the read/write operation on the second address managed by the third node, and the third node complies with an RO constraint. In this case, the first node obtains the operation permission of the first address and the operation permission of the second address from the third node, so that the first node participates in cache coherence management, and another node cannot perform read/write operations that require operation permission on the first address and the second address, that is, an execution sequence of the read/write operations on the first address and the second address is controlled by the first node, and the sequence of the globally observable execution results is also controlled by the first node. In this way, the sequence of the globally observable execution results of performing a read/write operation by the node that complies with the RO constraint meets the requirement of the node complies with the SO constraint.

In a possible implementation, that the first node performs read/write operations on the first address and the second address includes: The first node performs the read/write operations on the first address and the second address in parallel. In this implementation, read/write operation requests from the node that comply with the SO constraint can be processed in parallel, to improve transmission bandwidth and interaction efficiency between the node that complies with the SO constraint (the second node) and the node that complies with the RO constraint (the third node).

In a possible implementation, that the first node performs the read/write operations on the first address and the second address in parallel includes: The first node performs the read/write operations on the first address and the second address in parallel based on a sequence of receiving the first message and the second message. In this implementation, it can be ensured that the sequence of the globally observable execution results meets a requirement of a strong order model.

In a possible implementation, the second node complies with the strict order SO constraint, and the third node complies with the relax order RO constraint. This implementation explains why the execution sequence constraint of the read/write operation of the second node is stricter than the execution sequence constraint of the read/write operation of the third node.

In a possible implementation, the method further includes: The first node releases the operation permission of the first address to the third node after completing the read/write operation on the first address. In this way, the third node or another node may continue to perform a read/write operation on the first address. The first node releases the operation permission of the second address to the third node after completing the read/write operation on the second address. In this way, the third node or another node may continue to perform a read/write operation on the second address.

In a possible implementation, that the first node obtains the operation permission of the first address and the operation permission of the second address from the third node includes: The first node obtains an E state of the first address and an E state of the second address from the third node. This implementation provides a specific form of the operation permission of the first address and the operation permission of the second address.

In a possible implementation, when the first node requests the operation permission of the first address but does not obtain the operation permission of the first address, if the first node receives that the third node requests to perform a read/write operation that requires operation permission on the first address, or that the third node requests the operation permission of the first address, the first node indicates to the third node that the operation permission of the first address is not obtained, so that the third node or another node can perform the read/write operation on the first address. When the first node requests the operation permission of the second address but does not obtain the operation permission of the second address, if the first node receives that the third node requests to perform a read/write operation that requires operation permission on the second address, or that the third node requests the operation permission of the second address, the first node indicates to the third node that the operation permission of the second address is not obtained, so that the third node or another node can perform the read/write operation on the second address.

In a possible implementation, after the first node obtains the operation permission of the first address and the operation permission of the second address from the third node, the method further includes: When a preset condition is met, the first node releases the operation permission of the first address and the operation permission of the second address to the third node, so that the third node or another node can perform the read/write operations on the first address and the second address.

In a possible implementation, the preset condition is that the third node requests the operation permission of the first address and the second address, so that the third node or another node can perform the read/write operations on the first address and the second address.

In a possible implementation, the preset condition is that a time period for obtaining the operation permission of the first address by the first node from the third node is longer than or equal to a first preset time period, and a time period for obtaining the operation permission of the second address by the first node from the third node is longer than or equal to a second preset time period. After receiving a read/write request from the second node, the first node does not need to perform a process of obtaining the operation permission of the first address, and can quickly perform the read/write operation on the first address. After receiving the read/write request from the second node, the first node does not need to perform a process of obtaining the operation permission of the second address, and can quickly perform the read/write operation on the second address.

In a possible implementation, the method further includes: After the first node obtains the operation permission of the first address and before the first node starts to perform the read/write operation on the first address, and the third node requests to perform the read/write operation that requires the operation permission on the first address, or requests the operation permission of the first address, the first node releases the operation permission of the first address to the third node, and re-obtains the operation permission of the first address from the third node. The first node re-obtains the operation permission of the first address from the third node, to continue to perform the read/write operation on the first address. After the first node obtains the operation permission of the second address and before the first node starts to perform the read/write operation on the second address, and the third node requests to perform the read/write operation that requires the operation permission on the second address, or requests the operation permission of the first address, the first node releases the operation permission of the second address to the third node, and re-obtains the operation permission of the second address from the third node. When re-obtaining the operation permission of the second address from the third node, the first node may continue to perform the read/write operation on the second address.

In a possible implementation, the method further includes: When the first node starts to perform a write operation on the first address but does not obtain a cache address corresponding to the first address, and the third node requests to perform the read/write operation that requires the operation permission on the first address, or the third node requests the operation permission of the first address, after obtaining the cache address corresponding to the first address, the first node sends, to the third node, data written into the cache address corresponding to the first address, or indicates that the operation permission of the first address has been released, so that the third node or another node can perform the read/write operation on the first address. When the first node starts to perform a write operation on the second address but does not obtain a cache address corresponding to the second address, and the third node requests to perform the read/write operation that requires the operation permission on the second address, or the third node requests the operation permission of the second address, after obtaining the cache address corresponding to the second address, the first node sends, to the third node, data written into the cache address corresponding to the second address, or indicates that the operation permission of the second address has been released, so that the third node or another node can perform the read/write operation on the second address.

In a possible implementation, the second node is an input/output I/O device outside a system on chip SoC chip, the first node is a memory management unit (MMU) in the SoC chip, where the MMU may be an SMMU, and the third node is a memory controller in the SoC chip or a home agent HA in the memory controller. This implementation provides a specific application scenario.

In a possible implementation, the second node is a processor in the SoC chip, the first node is a network on chip NOC in the SoC chip or an interface module of the processor, and the third node is the memory controller in the SoC chip or the HA in the memory controller. This implementation provides another specific application scenario.

According to a second aspect, a system on chip SoC chip is provided, including a first node and a memory controller. The first node is configured to: receive a first message and a second message from a second node, where the first message is for requesting to perform a read/write operation on a first address managed by the memory controller, the second message is for requesting to perform a read/write operation on a second address managed by the memory controller, and an execution sequence constraint of the read/write operation on the second node is stricter than an execution sequence constraint of the read/write operation on the memory controller; obtain operation permission of the first address and operation permission of the second address from the memory controller; and perform read/write operations on the first address and the second address.

In a possible implementation, the first node is specifically configured to perform the read/write operations on the first address and the second address in parallel.

In a possible implementation, the first node is specifically configured to perform the read/write operations on the first address and the second address in parallel based on a sequence of receiving the first message and the second message.

In a possible implementation, the second node complies with a strict order SO constraint, and the memory controller complies with a relax order RO constraint.

In a possible implementation, the first node is further configured to: release the operation permission of the first address to the memory controller after completing the read/write operation on the first address; and release the operation permission of the second address to the memory controller after completing the read/write operation on the second address.

In a possible implementation, the first node is specifically configured to obtain an E state of the first address and an E state of the second address from the memory controller.

In a possible implementation, the first node is further configured to: when the first node requests the operation permission of the first address but does not obtain the operation permission of the first address, if the first node receives that the memory controller requests to perform a read/write operation that requires operation permission on the first address, or that the memory controller requests the operation permission of the first address, indicate to the memory controller that the operation permission of the first address is not obtained; and when the first node requests the operation permission of the second address but does not obtain the operation permission of the second address, if the first node receives that the memory controller requests to perform a read/write operation that requires operation permission on the second address, or that the memory controller requests the operation permission of the second address, indicate to the memory controller that the operation permission of the second address is not obtained.

In a possible implementation, after obtaining the operation permission of the first address and the operation permission of the second address from the memory controller, the first node is further configured to release the operation permission of the first address and the operation permission of the second address to the memory controller when a preset condition is met.

In a possible implementation, the preset condition is that the memory controller requests the operation permission of the first address and the second address.

In a possible implementation, the preset condition is that a time period for obtaining the operation permission of the first address by the first node from the memory controller is longer than or equal to a first preset time period, and a time period for obtaining the operation permission of the second address by the first node from the memory controller is longer than or equal to a second preset time period.

In a possible implementation, the second node is an input/output I/O device outside the SoC chip, and the first node is a memory management unit MMU in the SoC chip.

In a possible implementation, the second node is a processor in the SoC chip, and the first node is a network on chip NOC in the SoC chip or an interface module of the processor.

In a possible implementation, the first node includes a sequential processing module, an operation permission determining module, and a data cache determining module. The sequential processing module is configured to record a sequence of receiving the first message and the second message. The operation permission determining module is configured to: record whether the operation permission of the first address and the operation permission of the second address are received, and determine, based on the sequence, a sequence of performing the read/write operations on the first address and the second address. The data cache determining module is configured to: record whether an identifier of a cache address corresponding to the first address and an identifier of a cache address corresponding to the second address are received, to determine whether to send data.

For a technical effect of the second aspect, refer to the content described in the first aspect and any one of the implementations of the first aspect. Details are not described herein.

DETAILED DESCRIPTION OF ILLUSTRATIVE EMBODIMENTS

Figure 1:
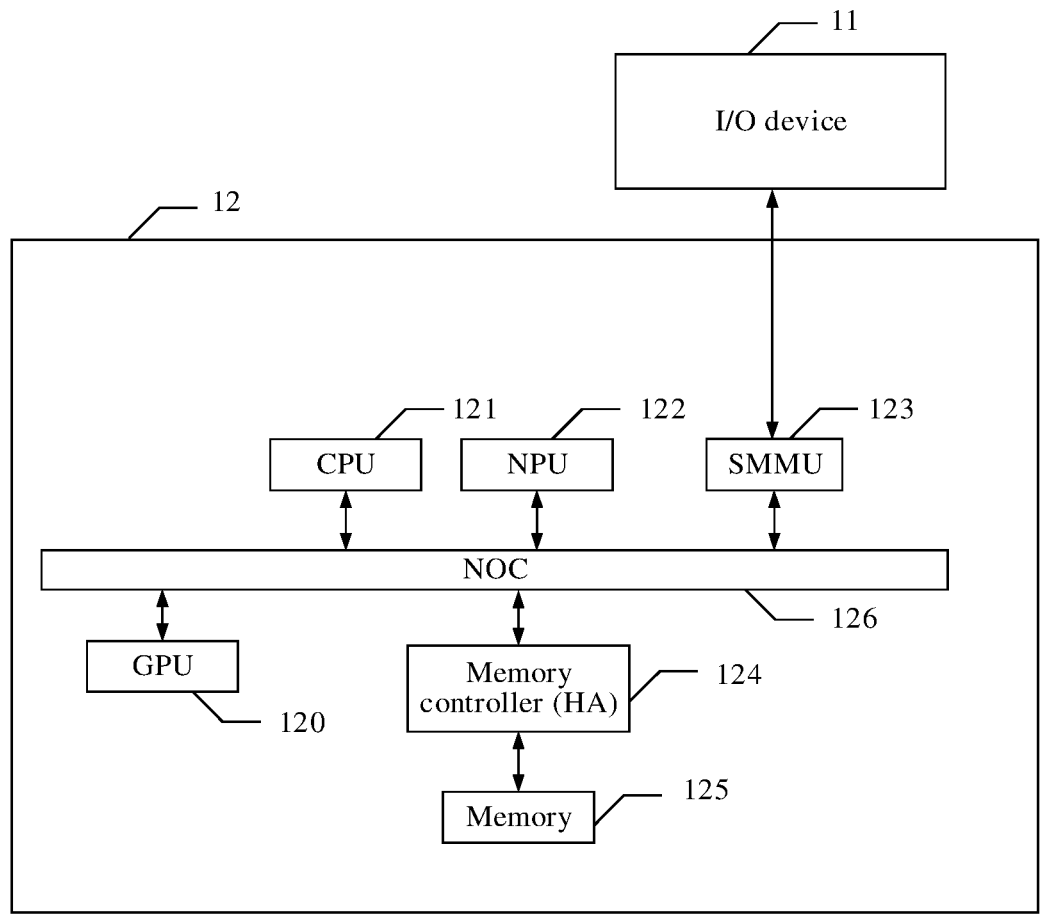
FIG. 1 is a schematic diagram of a structure of a chip system in which an I/O device communicates with a SoC chip according to an embodiment of this application.

First, some concepts in this application are described.

Memory consistency: After hardware performs a read/write operation, an execution result (whether the read/write operation is performed) of the read/write operation has a specific requirement on a globally observable sequence of other nodes. For example, a node sequentially performs one read/write operation on two addresses (equivalent to performing two read/write operations), or a node sequentially performs two read/write operations on one address, and other nodes not only know that the two read/write operations have been performed, but also know (in other words, it is globally observable) that a sequence of execution results of the two read/write operations meets software expectation, in other words, meets a requirement of memory consistency. For example, when there is a requirement on an execution sequence of the read/write operations, and write operations are performed on a first address and a second address in sequence, a correct sequence of globally observable execution results includes: A write operation is performed on each of the first address and the second address, a write operation is performed on only the first address, or no write operation is performed on the first address and the second address. An incorrect sequence of globally observable execution results includes: A write operation is performed on only the second address.

Cache coherence: A processor is a fast-running device relative to a memory. When the processor performs a read/write operation on the memory, if the processor processes another task after the operation is completed, the processor is fenced, and working efficiency of the processor is reduced. Therefore, one cache may be configured for each processor (where the cache is much faster than the memory but has a smaller capacity than the memory). When the processor writes data into the memory, the data may be first written into the cache, and then another task may be processed. A direct memory access (DMA) component stores the data into the memory. Similarly, when the processor reads the data in the memory, the DMA component first stores the data from the memory to the cache, and then the processor reads the data from the cache. When different processors perform read/write operations on a same address in the memory through the cache, there is a strict requirement on an execution sequence of the read/write operations, to be specific, before a previous read/write operation is completed, a next read/write operation is fenced, to prevent inconsistency between data in the cache and data in the memory caused by performing the read/write operations simultaneously.

A cache coherence device complies with the MESI protocol. The MESI protocol specifies four exclusive states of a cache line (cache line) (a minimum cache unit in a cache), including an E (Exclusive) state, an M (Modified) state, an S (Shared) state, and an I (Invalid) state. The E state indicates that the cache line is valid, the data in the cache is consistent with the data in the memory, and the data exists only in the cache; the M state indicates that the cache line is valid, the data is modified, the data in the cache is inconsistent with the data in the memory, and the data exists only in the cache; the S state indicates that the cache line is valid, the data in the cache is consistent with the data in the memory, and the data exists in a plurality of caches; and the I state indicates that the cache line is invalid.

The memory consistency model includes a sequential consistency (SC) model, a total store order (TSO) model, a relax model (RM), and the like in descending order of strictness of the required execution sequence. The SC model requires that an operating sequence of reading and writing a shared memory on the hardware be strictly consistent with an operating sequence required by software instructions. The TSO model introduces a cache mechanism based on the SC model and loosens a sequence constraint on a write-read (read-after-write) operation, in other words, a read operation in the write-read operation can be completed before a write operation. The RM model, which is the loosest, does not restrict a sequence of any read/write operation, to simplify hardware implementation, but ensures the execution sequence by using some software methods, such as fencing (fence) subsequent operations, only when required.

When a device in a strong order model sends a read/write request to a device in a weak order model, the strong order model may have a sequence constraint on a read/write combination (for example, write-write (write-after-write), write-read (read-after-write), read-write (write-after-read), or read-read (read-after-read)), but the weak order model does not have the sequence constraint. Therefore, for parallel read/write requests in the strong order model, the requests need to be serially executed in the weak order model based on the execution sequence of the strong order model, to ensure that a sequence of execution results that can be globally observable meets a requirement of the strong order model.

First, a chip system in FIG. 1 is used as an example to describe a typical application scenario in which a device in a strong order model sends a read/write request to a device in a weak order model.

As shown in FIG. 1, the chip system provided in an embodiment of this application includes an input/output (I/O) device 11 outside a SoC chip and a SoC chip 12. When the I/O device 11 is connected to the SoC chip 12 through a peripheral component interconnect express (PCIE), the I/O device 11 may be a PCIE card. When the I/O device 11 is connected to the SoC chip 12 through a network transmission protocol, the I/O device 11 may be an Ethernet port.

The I/O device 11 uses an X86 architecture, and a corresponding strong order model is a TSO model. The SoC chip 12 uses an ARM architecture, and a corresponding weak order model is an RM model.

For example, the SoC chip 12 may include a graphics processing unit (GPU) 120, a central processing unit (CPU) 121, a neural network processing unit (NPU) 122, a system memory management unit (SMMU) 123, a memory controller 124, and a memory 125, and optionally, may further include a network on chip (NOC) 126. The GPU 120, the CPU 121, the NPU 122, the SMMU 123, and the memory controller 124 are interconnected through the NOC 126.

The GPU 120 is a graphics processing core; the CPU 121 is a general-purpose processor core; the NPU 122 is an artificial intelligence (AI) dedicated processor core; the SMMU 123 is a system memory management unit configured to provide an address translation function based on a page table, for example, the SMMU 123 provides an address translation function between the I/O device 11 and the SoC chip 12; the memory controller 124 is configured to manage a data read/write operation in the memory 125; the memory controller 124 may further include a home agent (HA), where the HA is responsible for cache consistency management of the SoC chip, and may be integrated into the memory controller 124, or may be independently mounted on the NOC 126; and the memory 125 may be a memory, or may be an on-chip memory.

Figure 2:
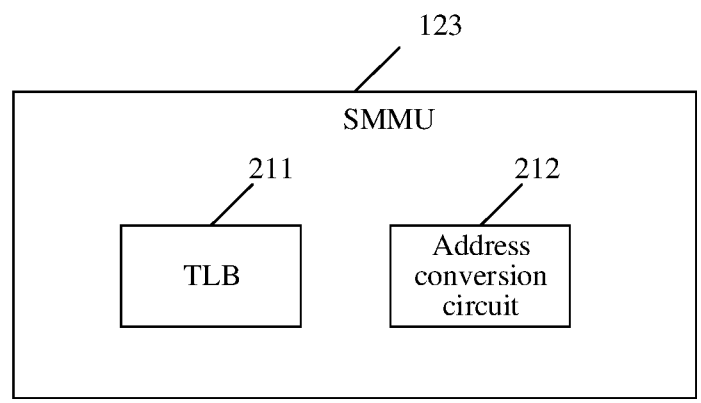
FIG. 2 is a schematic diagram of a structure of an SMMU according to an embodiment of this application.

Further, as shown in FIG. 2, the SMMU 123 may include a translation detection buffer (TLB) 211 and an address conversion circuit 212. The TLB 211 may reduce time used for accessing a user memory location, and the TLB 211 stores latest translation from a virtual memory to a physical memory, and may be referred to as an address translation cache. The address conversion circuit 212 is configured to perform translation from the virtual address to the physical address.

Figure 3:
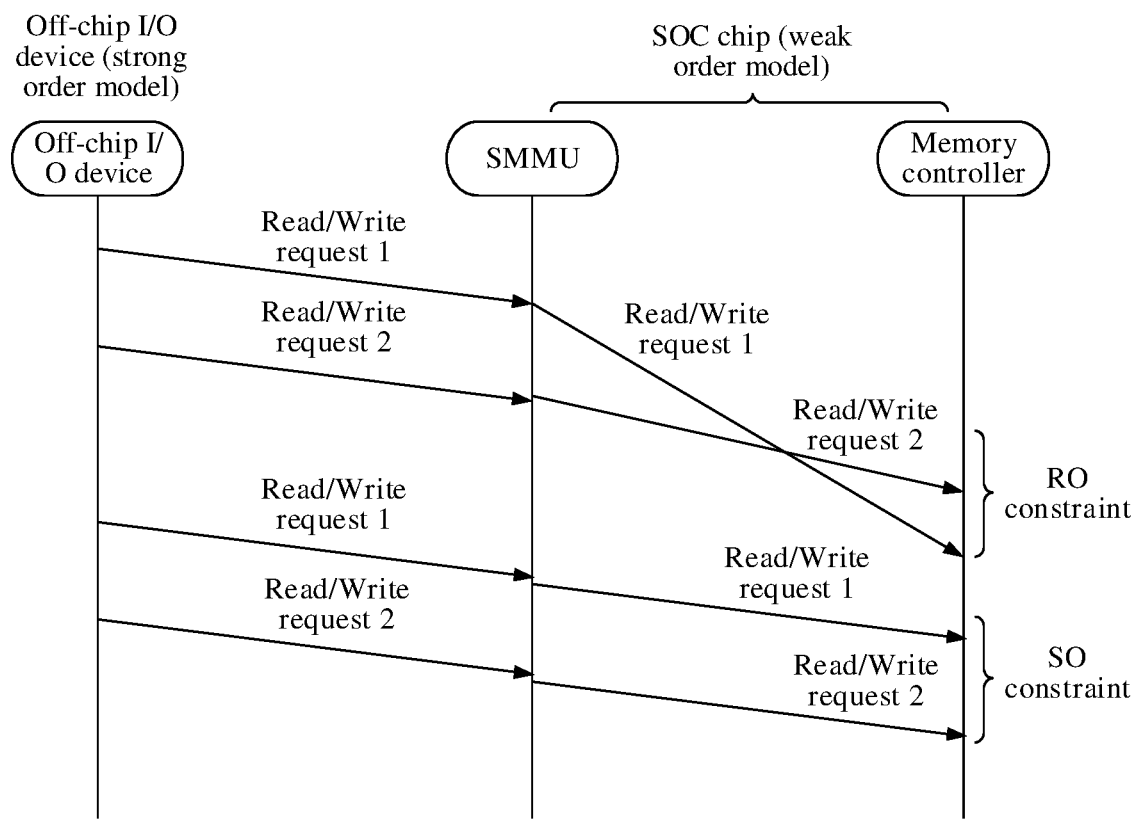
FIG. 3 is a schematic diagram of an RO constraint and an SO constraint of different memory consistency models according to an embodiment of this application.

As shown in FIG. 3, an I/O device (a second node in the following) sends a read/write request to a memory controller (a third node in the following) in a SoC chip through an SMMU (a first node in the following) in the SoC chip, that is, a device in a strong order model sends a read/write request to a device in a weak order model. For a read/write request with an RO constraint of the I/O device, both models allow out-of-order write-read requests (namely, read-after-write). In both models, the requests can be processed in parallel. Therefore, transmission bandwidth and interaction efficiency between the two models are not affected. However, for a read/write request with an SO constraint of the I/O device, after the request enters the SoC chip, corresponding read/write operations still need to be performed in sequence, to ensure that a sequence of execution results that can be globally observable meets a requirement of the strong order model.

Figure 4:
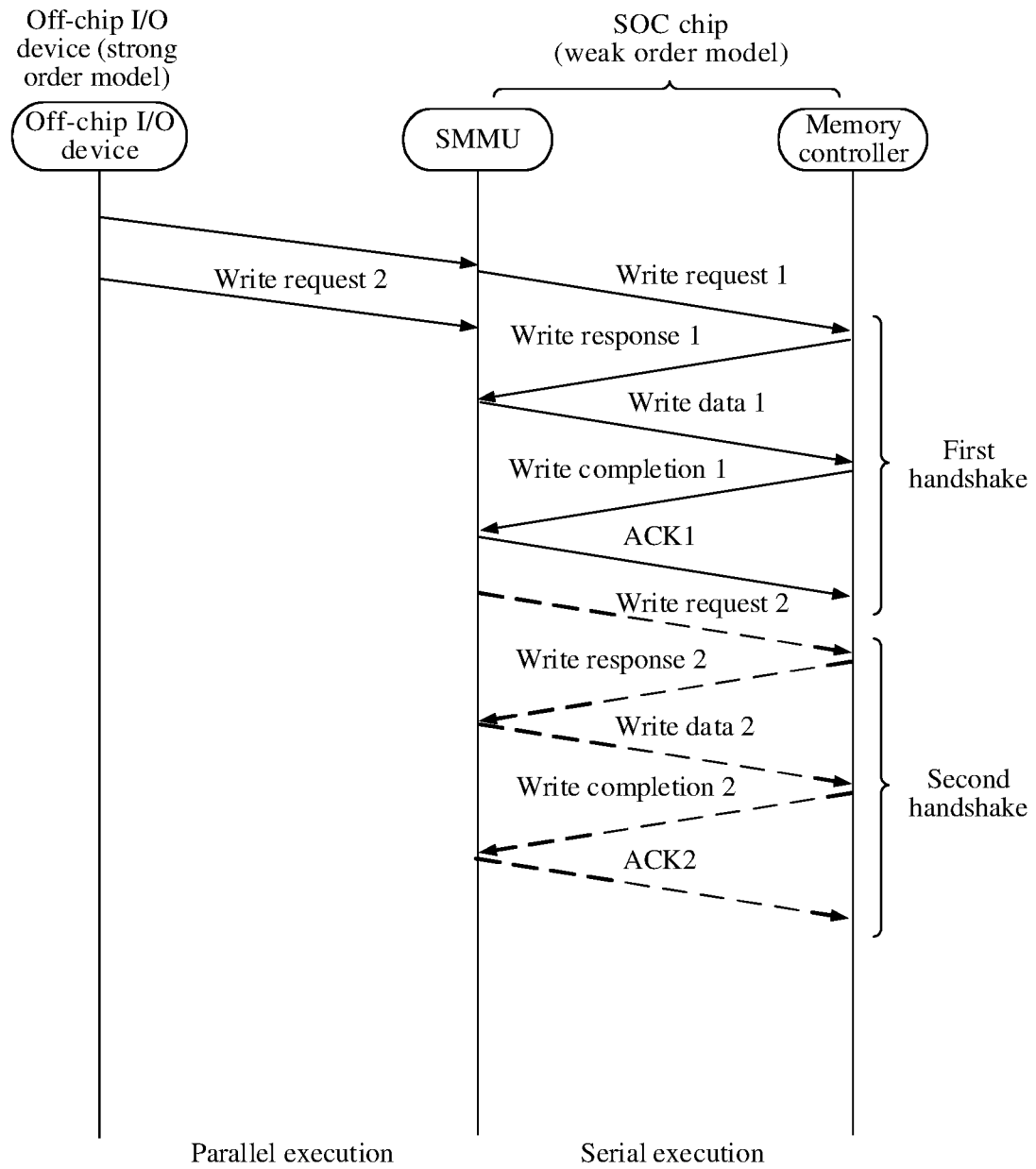
FIG. 4 is a schematic diagram 1 in which a sequence of globally observable execution results implemented in a weak order model meets a requirement of a strong order model according to an embodiment of this application.

For example, a write operation is used as an example. As shown in FIG. 4, an SMMU is used as an interface node between different memory consistency models. An I/O device in the strong order model sends a write request 1 and a write request 2 to the SMMU in a parallel sequence. After two handshakes, the SMMU sends the write request 1 and the write request 2 to a memory controller in the weak order model in a serial sequence. To be specific, after sending the write request 1 and corresponding data to the memory controller in the first handshake, the SMMU sends the write request 2 and corresponding data to the memory controller in the second handshake.

The write request 1 and the write request 2 indicate that write operations need to be performed, a write response 1 and a write response 2 indicate that data that can be received and a data storage location, write data 1 and write data 2 include to-be-written data and the data storage location, write completion 1 and write completion 2 indicate that the write operations are completed, and acknowledgment (acknowledge, ACK) 1 and ACK2 indicate that write completion is received.

In this manner, in the weak order model, a plurality of read/write requests with a sequence constraint can only be executed serially, and the SMMU and the memory controller need to repeatedly perform a handshake to ensure an execution sequence in the weak order model, so that transmission bandwidth and interaction efficiency between devices in different memory consistency models are reduced. In addition, universality and scalability are poor. When the memory controller is changed, the SMMU needs to re-establish a sequential processing mechanism with a new node.

Figure 5:
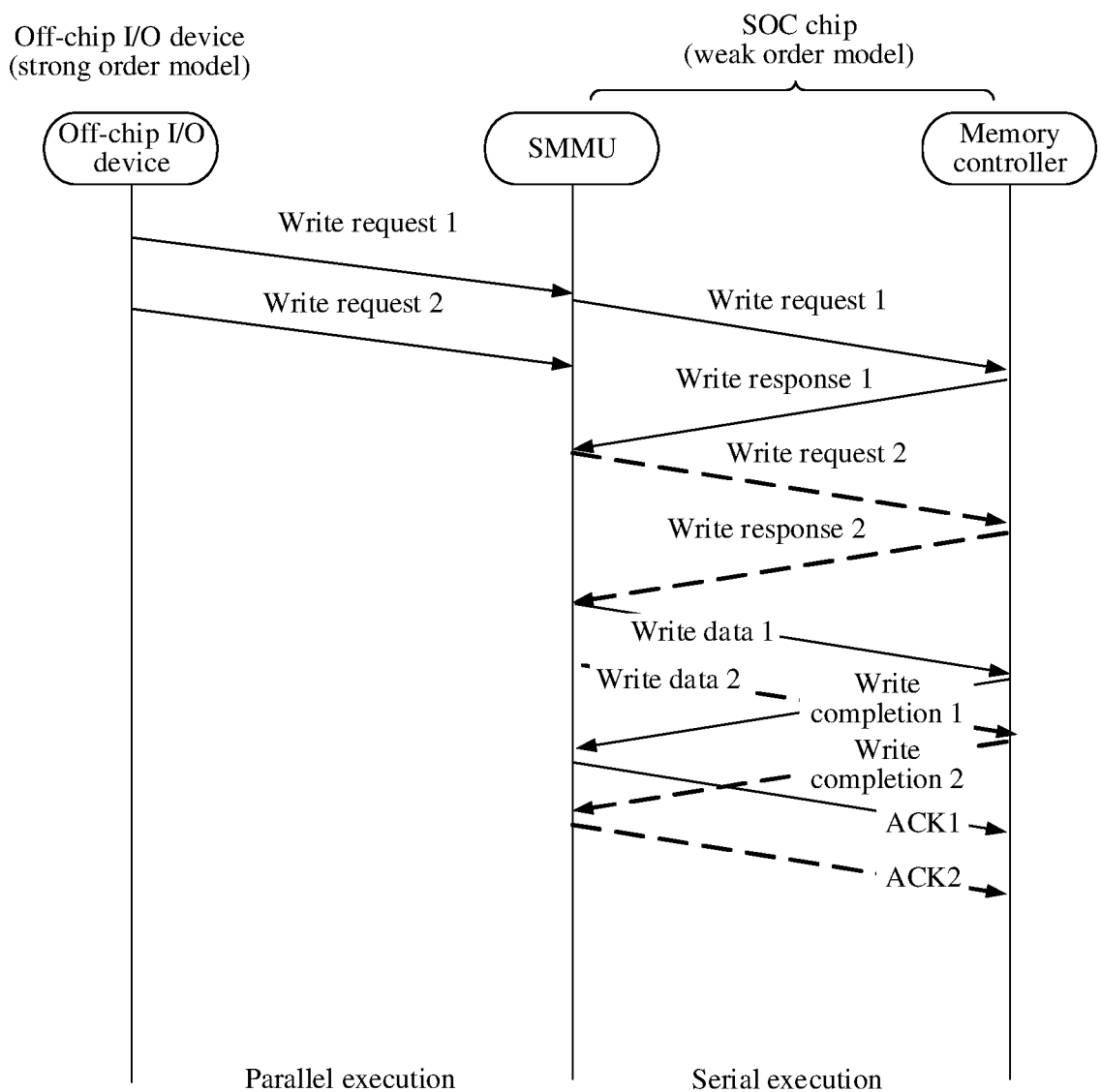
FIG. 5 is a schematic diagram 2 in which a sequence of globally observable execution results implemented in a weak order model meets a requirement of a strong order model according to an embodiment of this application.

For example, as shown in FIG. 5, to reduce time consumed by a handshake between an SMMU and a memory controller, the processing procedure in FIG. 3 is improved as follows: The SMMU sends a write request 1 to the memory controller and receives a write response 1. The SMMU may first send a write request 2 and receive a write response 2, without waiting for completion of the write request 1. Then the SMMU sends write data 1 and write data 2 in parallel, receives write completion 1 and write completion 2 in parallel, and sends ACK1 and ACK2 in parallel. The ACK1 is earlier than the ACK2, and the memory controller is notified that execution results of the write requests have been globally observable.

In this manner, in some scenarios (for example, a cross-chip scenario), a latency of receiving, by the SMMU, a write response returned by the memory controller is still long, and the transmission bandwidth and the interaction efficiency between the devices of the different memory consistency models are still reduced. In addition, the SMMU and the memory controller still need to perform at least one handshake, and a sequential processing mechanism is more complicated.

In addition, for communication between different modules in a same memory consistency model, when the memory consistency model (for example, a TSO model or an SC model) has a requirement on a sequence of globally observable execution results, and when a module that complies with an SO constraint sends a read/write request to a module that complies with an RO constraint, transmission bandwidth and interaction efficiency inside the model are also reduced.

The following uses an example in which a processor (for example, the GPU 120, the CPU 121, or the NPU 122) (a second node in the following) in the SOC chip that belongs to the weak order model in FIG. 1 sends a read/write request to the memory controller 124 (a third node in the following) through an interface (for example, the NOC 126 or an interface module in the processor) (a first node in the following) to describe a typical application scenario in which read/write requests are sent between different modules in the same memory consistency model.

Figure 6:
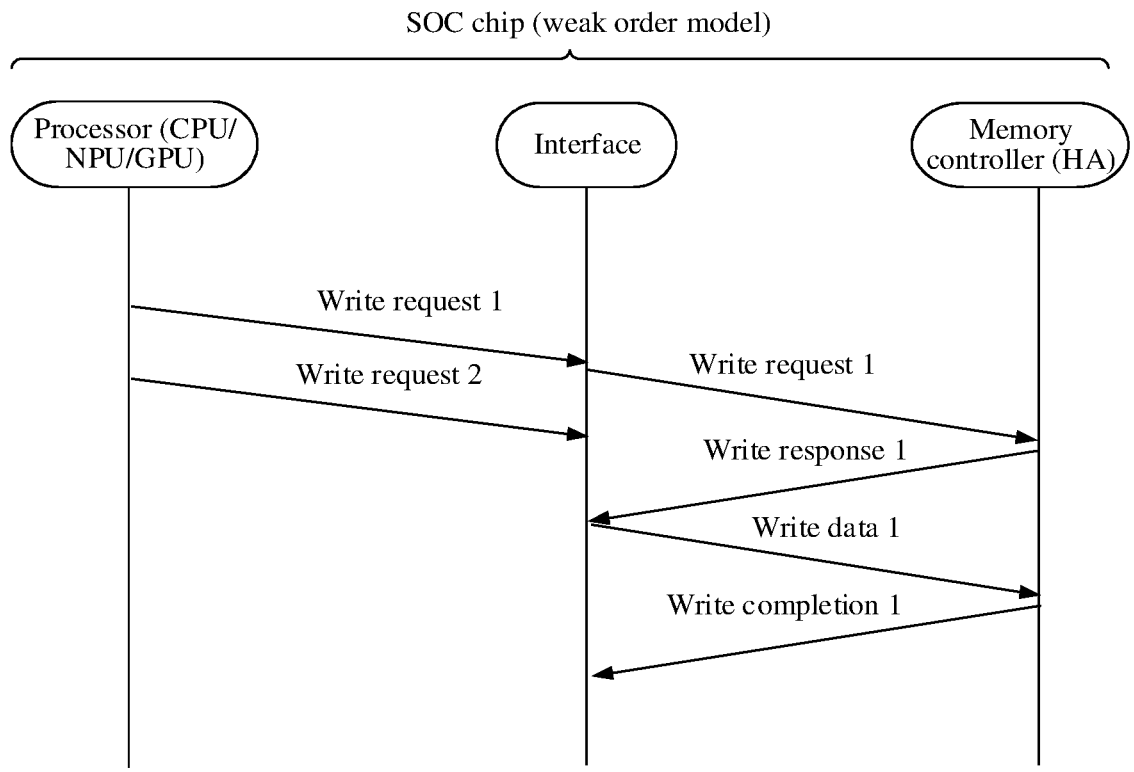
FIG. 6 is a schematic diagram of communication between different modules in a same memory consistency model according to an embodiment of this application.

For example, as shown in FIG. 6, when a processor that complies with an SO constraint sends a plurality of read/write requests (for example, a stream-write request) in parallel, before these requests enter an out-of-order bus that complies with an RO constraint, an execution sequence is ensured by a model itself. When these requests enter the out-of-order bus through an interface between the out-of-order bus and are sent to a memory controller, to ensure that a sequence of globally observable execution results meets a requirement of a strong order model, a serial execution manner similar to that in FIG. 4 or a partial serial execution manner (not shown in FIG. 6) in FIG. 5 is used. Therefore, transmission bandwidth and interaction efficiency inside the model are reduced.

Therefore, an embodiment of this application provides a read/write operation execution method, which may be applied to communication between different memory consistency models, or may be applied to communication between different modules in a same memory consistency model, to optimize the transmission bandwidth and interaction efficiency inside the model.

Figure 7:
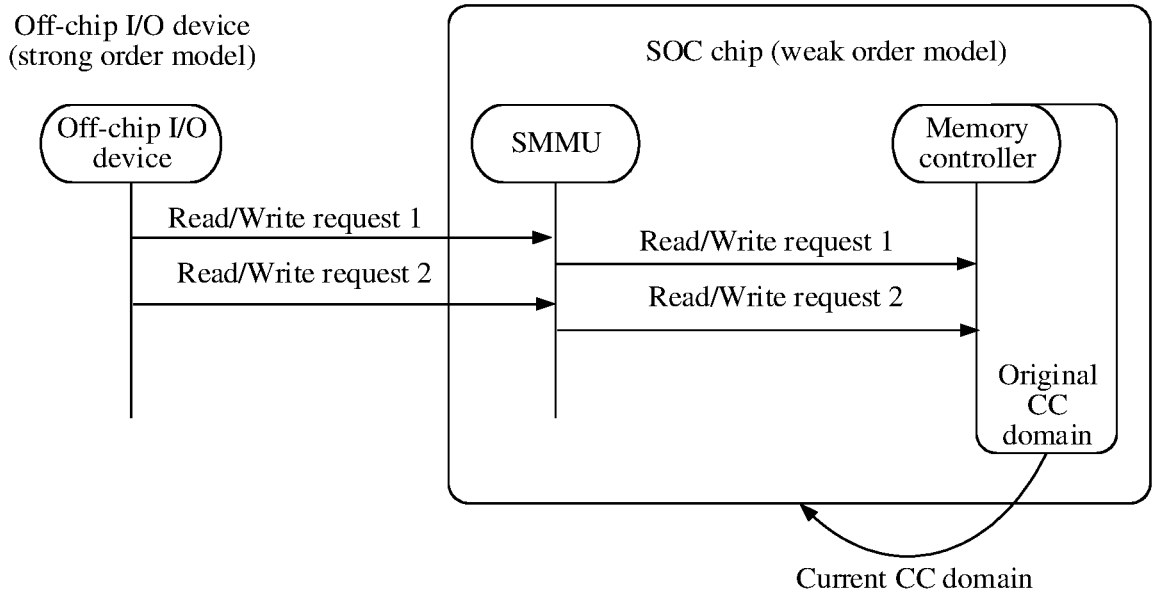
FIG. 7 is a schematic diagram of an improvement of a weak order model according to an embodiment of this application.

For communication between different memory consistency models, as shown in FIG. 7, by extending a cache coherence (CC) domain of a weak order model, an interface node SMMU between different models is also included in the CC domain, and sequential processing is completed in the SMMU, so that parallel read/write requests from a strong order model can also be processed in parallel in the weak order model, and transmission bandwidth and interaction efficiency between a device that complies with an SO constraint and a device that complies with an RO constraint are improved. In addition, because the sequential processing is completed in the SMMU, a memory controller of the weak order model does not need a sequential processing mechanism, and when the memory controller is changed, the sequential processing mechanism does not need to be re-established. Therefore, universality and scalability are higher.

Because read/write requests have a clear sequence relationship in software, and the strong order model in which an I/O device is located restricts such a sequence of read/write requests, in the strong order model, the read/write requests can be efficiently processed in parallel after being sent in sequence.

After the read/write requests arrive at the SMMU of an interface between the two models, to ensure an execution sequence in the weak order model, before a solution provided in this application is used, the memory controller inside the weak order model implements the cache coherence, and the SMMU does not participate in cache coherence management. Therefore, cache coherence processing cannot be performed in the SMMU to ensure that a sequence of globally observable execution results in the weak order model meets a requirement of the strong order model, and the cache coherence can be implemented only by the memory controller through a handshake process. Consequently, transmission bandwidth and interaction efficiency between devices of different memory consistency models are reduced. In this application, the cache coherence domain of the weak order model is extended, and cache coherence processing permission is transferred from the internal memory controller to the SMMU. After receiving a read/write request of the strong order model, the SMMU may complete sequential processing, to ensure that the sequence of the globally observable execution results in the weak order model meets the requirement of the strong order model.

After the SMMU completes the sequential processing, a serial handshake with the I/O device may be avoided, and the read/write requests may be processed in parallel in the weak order model, so that parallel processing efficiency is improved.

Figure 8:
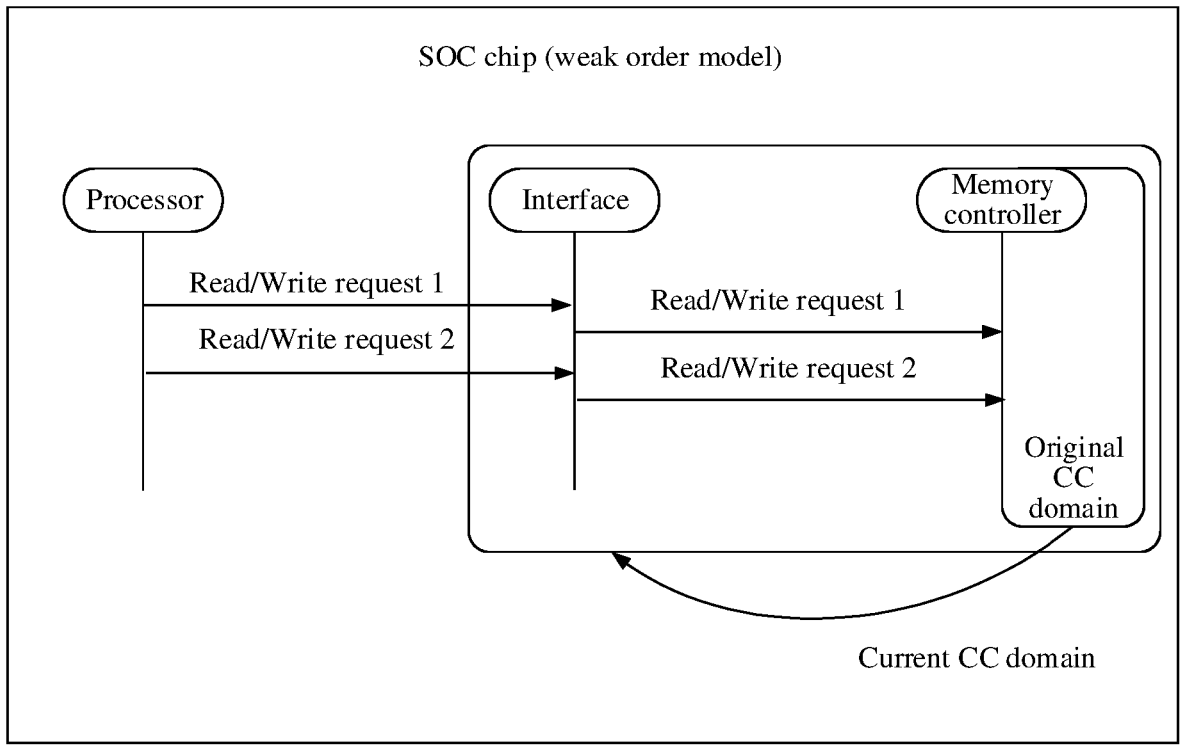
FIG. 8 is a schematic diagram of an improvement of a same memory consistency model according to an embodiment of this application.

For communication between different modules in a same memory consistency model, as shown in FIG. 8, a CC domain that complies with an RO constraint may be extended, and an interface between a module (for example, a processor) that complies with an SO constraint and a module (for example, a memory controller) that complies with the RO constraint in the model is also included in the CC domain, so that read/write requests from the module that complies with the SO constraint may also be processed in parallel in the interface and the module that complies with the RO constraint, to optimize transmission bandwidth and interaction efficiency inside the model.

In addition, in this application, the cache coherence domain of the weak order model is extended, and cache coherence processing permission is transferred from the memory controller to the interface between the processor and the memory controller. After receiving the read/write requests from the processor, the interface may complete sequential processing, to ensure that a sequence of globally observable execution results in the module that complies with the RO constraint meets a requirement of the module that complies with the RO constraint.

Figure 9:
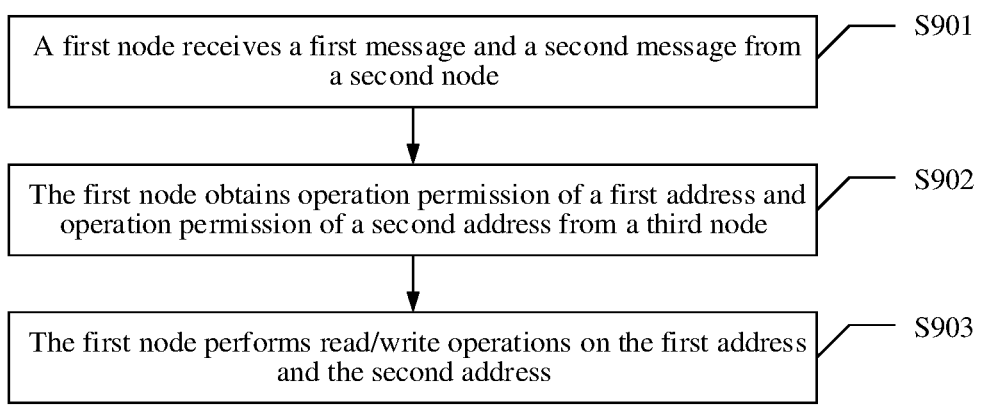
FIG. 9 is a schematic flowchart 1 of a read/write operation execution method according to an embodiment of this application.

As shown in FIG. 9, a read/write operation execution method provided in an embodiment of this application includes the following steps.

S901: A first node receives a first message and a second message from a second node.

The first message is for requesting to perform a read/write operation on a first address managed by a third node, and the second message is for requesting to perform a read/write operation on a second address managed by the third node. An execution sequence constraint of the read/write operation of the second node is stricter than an execution sequence constraint of the read/write operation of the third node, that is, the second node complies with an SO constraint, and the third node complies with an RO constraint. Because the second node complies with the SO constraint, actually, the first message is for requesting to perform, in a strict order, the read/write operation on the first address managed by the third node, and the second message is for requesting to perform, in the strict order, the read/write operation on the second address managed by the third node.

For communication between different memory consistency models, the second node is a device that complies with the SO constraint in a strong order model, and the third node is a device that complies with the RO constraint in a weak order model. The first node is an interface node located between the strong order model and the weak order model, where the first node may be an independent device, or may be an interface module in the second node or the third node.

Figure 10:
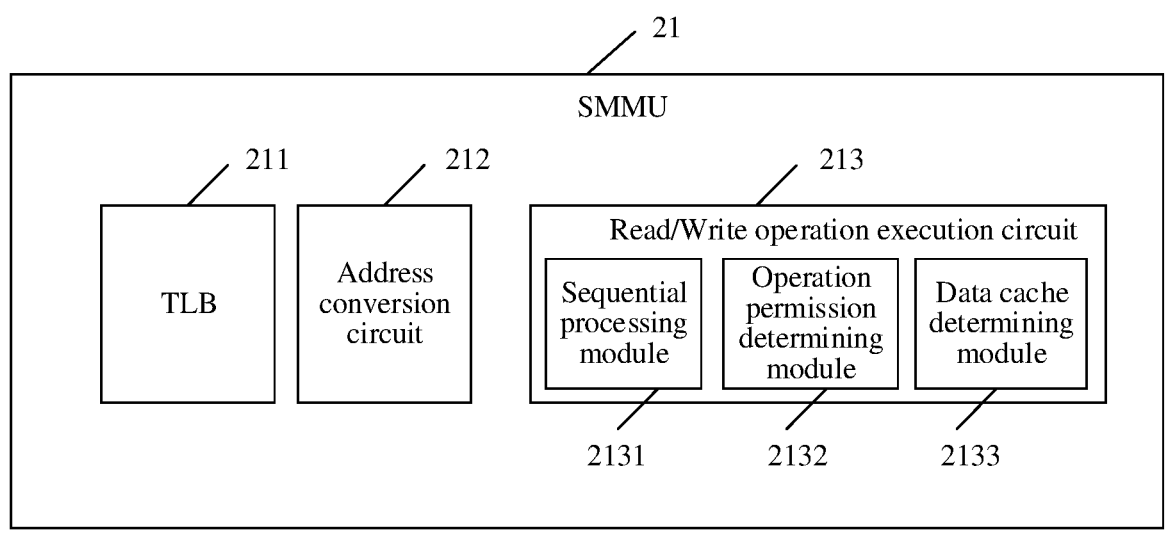
FIG. 10 is a schematic flowchart 2 of a read/write operation execution method according to an embodiment of this application.

For example, the second node may be the I/O device 11 located outside the SoC chip 12 in FIG. 1, and is configured to send a read/write request; the third node may be the memory controller 124 in the SoC chip 12 or the HA in the memory controller 124 in FIG. 1, and is configured to: perform cache coherence management, for example, manage a directory of storage space; and the first node may be an MMU, for example, may be the SMMU 123 in the SoC chip 12 in FIG. 1 or a read/write operation execution circuit 213 in the SMMU 123 shown in FIG. 10, where the read/write operation execution circuit 213 is newly added to the SMMU 123 shown in FIG. 2, and is configured to perform the read/write operation execution method provided in this application.

Further, FIG. 10 is a schematic diagram of a structure of a read/write operation execution circuit 213. The read/write operation execution circuit 213 includes a sequential processing module 2131, an operation permission determining module 2132, and a data cache determining module 2133.

The sequential processing module 2131 is configured to: record a sequence of receiving the first message and the second message, and is used by the operation permission determining module 2132 to perform read/write operations in sequence.

The operation permission determining module 2132 is configured to: record whether operation permission (for example, an E state) of the first address and operation permission (for example, an E state) of the second address are received, and determine a sequence of performing the read/write operations on the first address and the second address based on the sequence of the first message and the second message recorded by the sequential processing module 2131. For example, if the sequential processing module 2131 records that the first message is received before the second message is received, the sequential processing module 2131 first sends a writeback (WriteBack) message for the first address, and then send a writeback message for the second address. For a write operation, the writeback message may include a write operation type and a destination address (the first address or the second address); and for a read operation, the writeback message may include a read operation type and a destination address.

The data cache determining module 2133 is configured to: record whether an identifier (for example, a data buffer ID (DBID)) of a cache address corresponding to the first address that is returned by the memory controller, and an identifier (for example, DBID) of a cache address corresponding to the first address are received, to determine whether to send data.

It should be noted that, in a scenario in which an I/O device accesses an on-chip storage of a SoC, in other words, different memory consistency models communicate, a read/write operation execution circuit 214 may be located in the SMMU as the first node. Similarly, in a scenario in which an on-chip processor accesses an on-chip storage, in other words, different modules in a same memory consistency model communicate, the read/write operation execution circuit 214 may be located in an NOC or the on-chip processor as the first node.

In addition, it should be noted that this application is described by using a scenario of communication between different memory consistency models as an example, but is not intended to be limited thereto.

For communication between modules in the same memory consistency model, the first node is a module that is in the memory consistency model and that complies with an SO constraint, the third node is a module that is in the memory consistency model and that complies with an RO constraint, and the second node is an interface module that is in the memory consistency model and that is used for interaction between the first node and the third node.

For example, the second node is a processor (for example, a GPU 120, a CPU 121, or an NPU 122) in a SoC chip in FIG. 1, the second node is an on-chip NOC 126 in the SoC chip or an interface module (the module is a hardware circuit) of the processor, and the third node is a memory controller 124 in the SoC chip or an HA in the memory controller 124. Alternatively, the first node, the second node, and the third node are different hardware modules inside the processor.

The read/write operation in this application may support operations including write-write (write-after-write), write-read (read-after-write), read-write (write-after-read), read-read (read-after-read), and the like. The first message or the second message may be a write request and corresponds to a write operation, or may be a read request and corresponds to a read operation. A quantity of first messages or second messages is not limited to one, and there may be a plurality of first messages or second messages. In addition, message types of the first message and the second message may be the same, for example, both are write requests (namely, write-write requests) or read requests (namely, read-read requests), or may be different, for example, one is a write request and the other is a read request (namely, a write-read request or a read-write request). In addition, a first address of the first message may be the same as or different from a second address of the second message.

Figure 11:
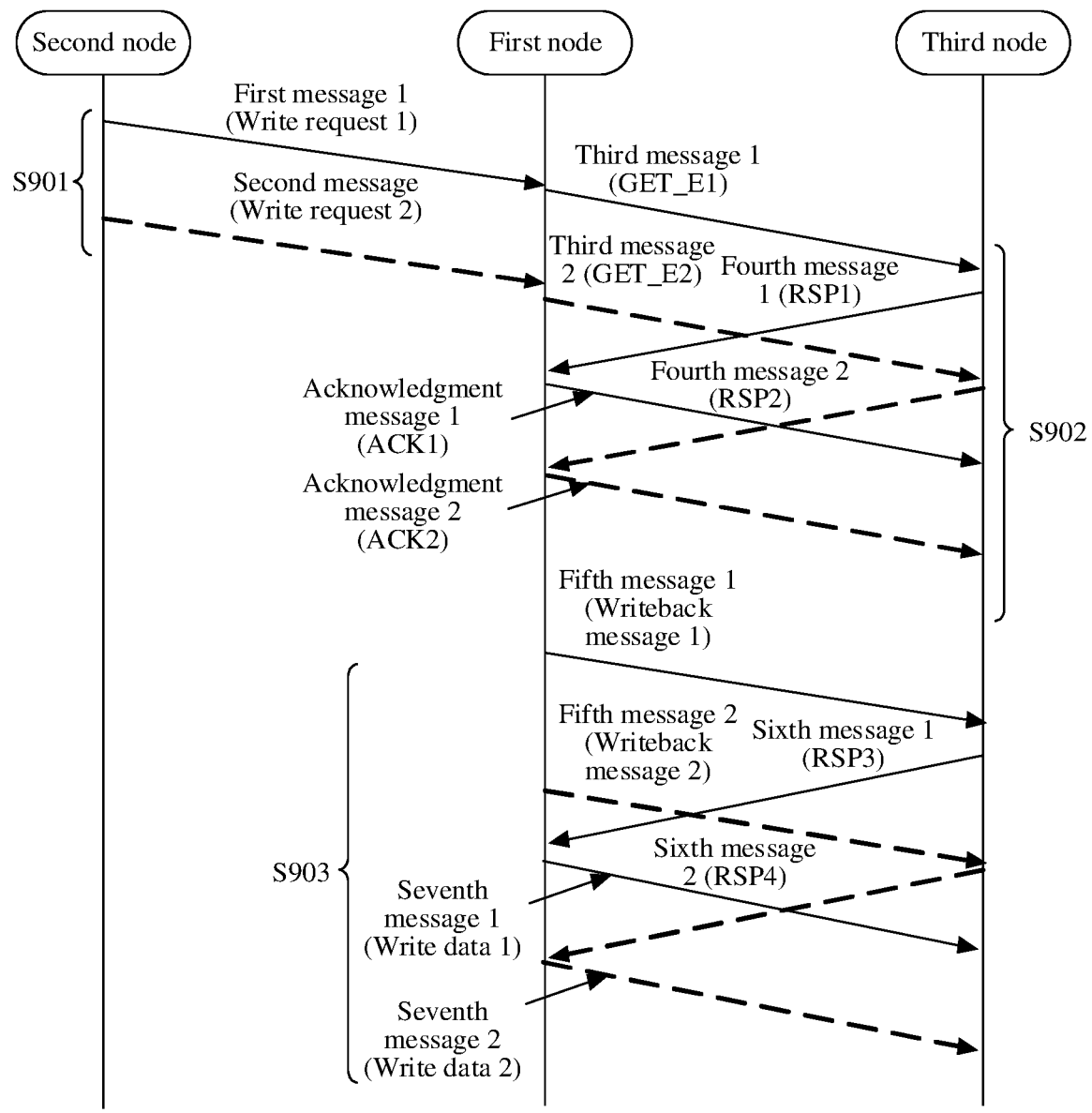
FIG. 11 is a schematic flowchart 3 of a read/write operation execution method according to an embodiment of this application.

For example, as shown in FIG. 11, the second node may send the first message and the second message to the first node, where the first message and the second message may be write request messages. The first message is for requesting to perform, in the strict order, a write operation on the first address managed by the third node, and the second message is for requesting to perform, in the strict order, a write operation on the second address managed by the third node.

S902: The first node obtains operation permission of the first address and operation permission of the second address from the third node.

Operation permission may be an E state in cache coherence, and indicates operation permission of a node on an address. In other words, the first node may obtain an E state of the first address and an E state of the second address from the third node.

After the first node obtains the operation permission of the first address and the second address, a CC domain is extended from the third node to the first node, so that the first node participates in cache coherence management in the weak order model, and another node (for example, the third node) cannot perform read/write operations that require operation permission on the first address and the second address, that is, sequential processing permission of the third node on a read/write request has been transferred to the first node, and an execution sequence of the read/write operations on the first address and the second address are controlled by the first node.

The following specifically describes how the first node obtains the operation permission of the first address and the operation permission of the second address.

The first node may send a third message to the third node, where the third message includes the first address, and the second message is for requesting the operation permission of the first address. After receiving the second message, the third node may send a fourth message to the first node, where the fourth message may be a response message of the third message, and the fourth message indicates the operation permission of the first address. After receiving the fourth message, the first node may send an acknowledgment message of the fourth message to the third node, where the acknowledgment message indicates that the first node receives the fourth message.

Similarly, the first node may send a third message to the third node, where the third message includes the second address, and the second message is for requesting the operation permission of the second address. After receiving the second message, the third node may send a fourth message to the first node, where the fourth message may be a response message of the third message, and the fourth message indicates the operation permission of the second address. After receiving the fourth message, the first node may send an acknowledgment message of the fourth message to the third node, where the acknowledgment message indicates that the first node receives the fourth message.

A sequence of the first node obtaining the operation permission of the first address and the operation permission of the second address from the third node is not limited in this application. For example, it is assumed that the first node first receives the first message (including the first address) and then receives the second message (including the second address). The first node may first obtain the operation permission of the second address and then obtain the operation permission of the first address.

With reference to FIG. 11, the following describes how the first node obtains the operation permission of the first address and the operation permission of the second address.

For example, as shown in FIG. 11, the first node may send a third message 1 and a third message 2 to the third node, where the third message 1 and the third message 2 may be GET_E messages. The third message 1 includes the first address, and the third message 2 includes the second address. The third message 1 is for requesting the operation permission of the first address, and the third message 2 is for requesting the operation permission of the second address. A sequence of the first node sending the third message 1 and the third message 2 to the third node is not limited in this application.

The third node sends a fourth message 1 and a fourth message 2 to the first node, where the fourth message 1 may be a response message (RSP1) of the third message 1, and the fourth message 2 may be a response message (RSP2) of the third message 2. Correspondingly, the first node receives the fourth message 1 and the fourth message 2 from the third node. The fourth message 1 indicates the first node to obtain the operation permission of the first address, and the fourth message 2 indicates the first node to obtain the operation permission of the second address.

The first node sends an acknowledgment message 1 (ACK1) of the fourth message 1 and an acknowledgment message 2 (ACK2) of the fourth message 2 to the third node. The two acknowledgment messages indicate that the first node receives the fourth message.

There is no execution sequence between step S901 and step S902. For example, step S901 may be performed before step S902, or step S902 may be performed before step S901.

S903: The first node performs read/write operations on the first address and the second address.

This application does not limit an execution sequence of the read/write operations performed by the first node on the first address and the second address. In a possible implementation, the first node may perform the read/write operations on the first address and the second address in parallel, and in parallel means that a next read/write operation is performed without waiting for completion of a previous read/write operation, so that parallel processing of a plurality of read/write operations is implemented in the weak order model.

The first node performs the read/write operations on the first address and the second address in parallel, so that requests from the strong order model can be processed in parallel, and transmission bandwidth and interaction efficiency between a node (the second node) that complies with the SO constraint and a node (the third node) that complies with the RO constraint are improved.

A sequence of the first node starting to perform the read/write operations on the first address and the second address may be the same as a sequence of receiving the first message and the second message, in other words, the first node may perform the read/write operations on the first address and the second address in parallel based on the sequence of receiving the first message and the second message. For example, if the first node first receives the first message and then receives the second message, the first node may first perform a read/write operation on the first address and then perform a read/write operation on the second address. Therefore, the first node completes sequential processing of read/write requests, to implement memory consistency.

The following specifically describes how the first node performs the read/write operations on the first address and the second address.

The first node may send a fifth message to the third node, where the fifth message indicates to perform the read/write operation on the first address, and the fifth message may be a writeback (WriteBack) message. For a write operation, the fifth message may include to-be-written data, a write operation type, and the first address; and for a read operation, the fifth message may include a read operation type and the first address. Similarly, the first node may send a fifth message to the third node, where the fifth message indicates to perform the read/write operation on the second address, and the fifth message may be the writeback (WriteBack) message. For the write operation, the fifth message may include to-be-written data, a write operation type, and the second address; and for the read operation, the fifth message may include a read operation type and the second address.

A sequence of the first node sending the fifth message corresponding to the first address and the fifth message corresponding to the second address may be the same as the sequence of receiving the first message and the second message. For example, if the first node first receives the first message and then receives the second message, the first node first sends the fifth message corresponding to the first address and then sends the fifth message corresponding to the second address.

After receiving the fifth message, the third node may send a sixth message to the first node, where the sixth message may be a response message of the fifth message, and the sixth message indicates a cache address corresponding to the first address. Similarly, after receiving the fifth message, the third node may send a sixth message to the first node, where the sixth message may be a response message of the fifth message, and the sixth message indicates a cache address corresponding to the second address.

After receiving the sixth message, the first node sends a seventh message to the third node, where the seventh message may be a write data (WriteData) message, and the seventh message is for performing a read/write operation on the cache address corresponding to the first address. Similarly, after receiving the sixth message, the first node sends a seventh message to the third node, where the seventh message may be the write data (WriteData) message, and the seventh message is for performing a read/write operation on the cache address corresponding to the second address.

For example, as shown in FIG. 11, the first node sends a fifth message 1 and a fifth message 2 to the third node, where the fifth message 1 and the fifth message 2 may be writeback (WriteBack) messages. The fifth message 1 corresponds to the first message and indicates to perform a write operation on the first address; and the fifth message 2 corresponds to the second message and indicates to perform a write operation on the second address. Because the first node first receives the first message and then receives the second message from the second node, the first node first sends the fifth message 1 and then sends the fifth message 2 to the third node. In this case, parallel means that the first node may send the fifth message 2 without waiting for completion of all read/write operations corresponding to the fifth message 1.

The third node sends a sixth message 1 and a sixth message 2 to the first node, where the sixth message 1 may be a response message (RSP3) of the fifth message 1, and the sixth message 2 may be a response message (RSP4) of the fifth message 2. The sixth message 1 indicates the cache address corresponding to the first address, and the fifth message 2 indicates the cache address corresponding to the second address.

The first node sends a seventh message 1 and a seventh message 2 to the third node, where the seventh message may be the write data (WriteData) message. The seventh message 1 is for writing data into the cache address corresponding to the first address, and the seventh message 2 is for writing data into the cache address corresponding to the second address.

The first node may release the operation permission of the first address to the third node after completing the read/write operation on the first address. For example, the seventh message may be further used for releasing the operation permission of the first address to the third node. In this way, the third node or another node may continue to perform a read/write operation on the first address. Similarly, the first node may release the operation permission of the second address to the third node after completing the read/write operation on the second address. For example, the seventh message may be further used for releasing the operation permission of the second address to the third node. In this way, the third node or another node may continue to perform a read/write operation on the second address.

For example, as shown in FIG. 11, the seventh message 1 further indicates to release the operation permission of the first address to the third node, and the seventh message 2 further indicates to release the operation permission of the second address to the third node.

According to the read/write operation execution method provided in this embodiment of this application, the first node receives the first message and the second message from the second node, the second node complies with the SO constraint, the first message requests to perform the read/write operation on the first address managed by the third node, the second message requests to perform the read/write operation on the second address managed by the third node, and the third node complies with the RO constraint. In this case, the first node obtains the operation permission of the first address and the operation permission of the second address from the third node, so that the first node participates in cache coherence management, and another node cannot perform read/write operations that require operation permission on the first address and the second address, that is, an execution sequence of the read/write operations on the first address and the second address is controlled by the first node, and a sequence of globally observable execution results is also controlled by the first node. In this way, a sequence of globally observable execution results of performing a read/write operation by a node that complies with the RO constraint meets a requirement of a node complies with the SO constraint.

With reference to FIG. 12 to FIG. 19, how the first node performs processing to meet a memory consistency requirement and ensure that a sequence of globally observable execution results meets a requirement of a strong order model is described in the following based on a cache coherence principle and the following case: In a process in which a first node interacts with a third node to perform a read/write operation, if another node needs to perform a read/write operation that requires operation permission on a first address (or a second address), the third node requests operation permission of the first address (or the second address) or performs the read/write operation that requires the operation permission on the first address (or the second address).

Figure 12:
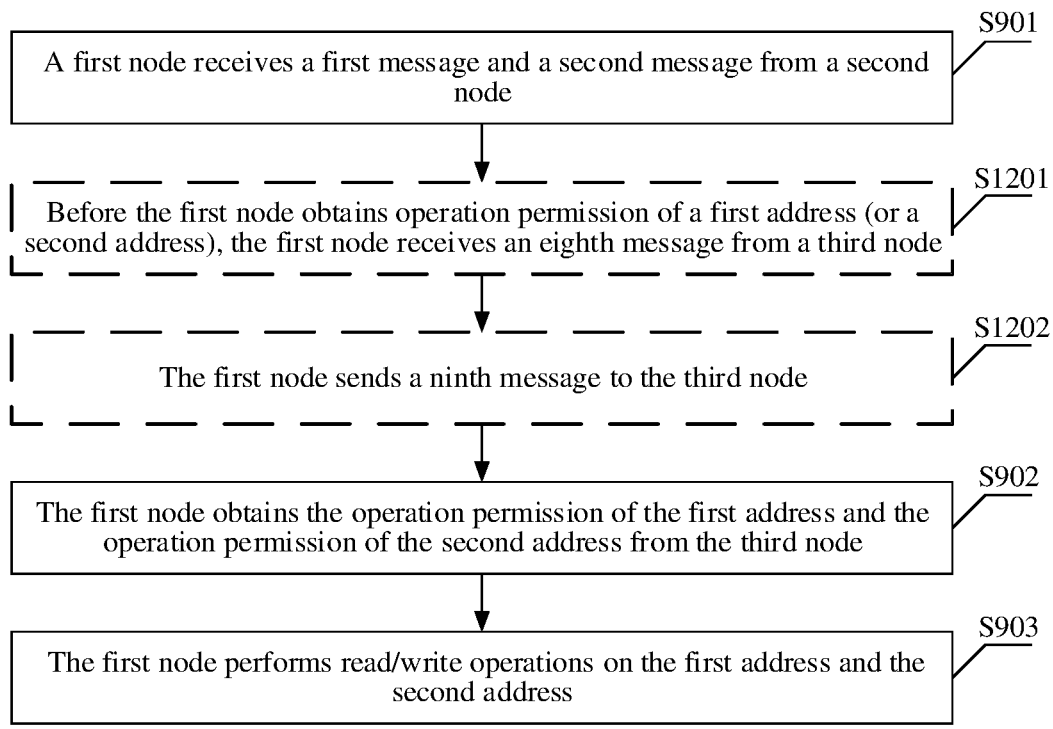
FIG. 12 is a schematic flowchart 4 of a read/write operation execution method according to an embodiment of this application.

In a possible implementation, when the first node requests the operation permission of the first address but does not obtain the operation permission of the first address, if the first node receives that the third node requests to perform the read/write operation that requires the operation permission on the first address, or that the third node requests the operation permission of the first address, the first node indicates to the third node that the operation permission of the first address is not obtained. Similarly, before the first node requests the operation permission of the second address but does not obtain the operation permission of the second address, if the first node receives that the third node requests to perform the read/write operation that requires the operation permission on the second address, or requests the operation permission of the second address, the first node indicates to the third node that the operation permission of the second address is not obtained. As shown in FIG. 12, the foregoing read/write operation execution method further includes the following steps.

S1201: Before the first node obtains the operation permission of the first address (or the second address), the first node receives an eighth message from the third node.

The eighth message is for requesting to perform a read/write operation that requires the operation permission on the first address, or is for requesting the operation permission of the first address. Similarly, the eighth message is for requesting to perform a read/write operation that requires the operation permission on the second address, or is for requesting the operation permission of the second address. For example, the eighth message may be a sniffing (snoop) message.

Figure 13:
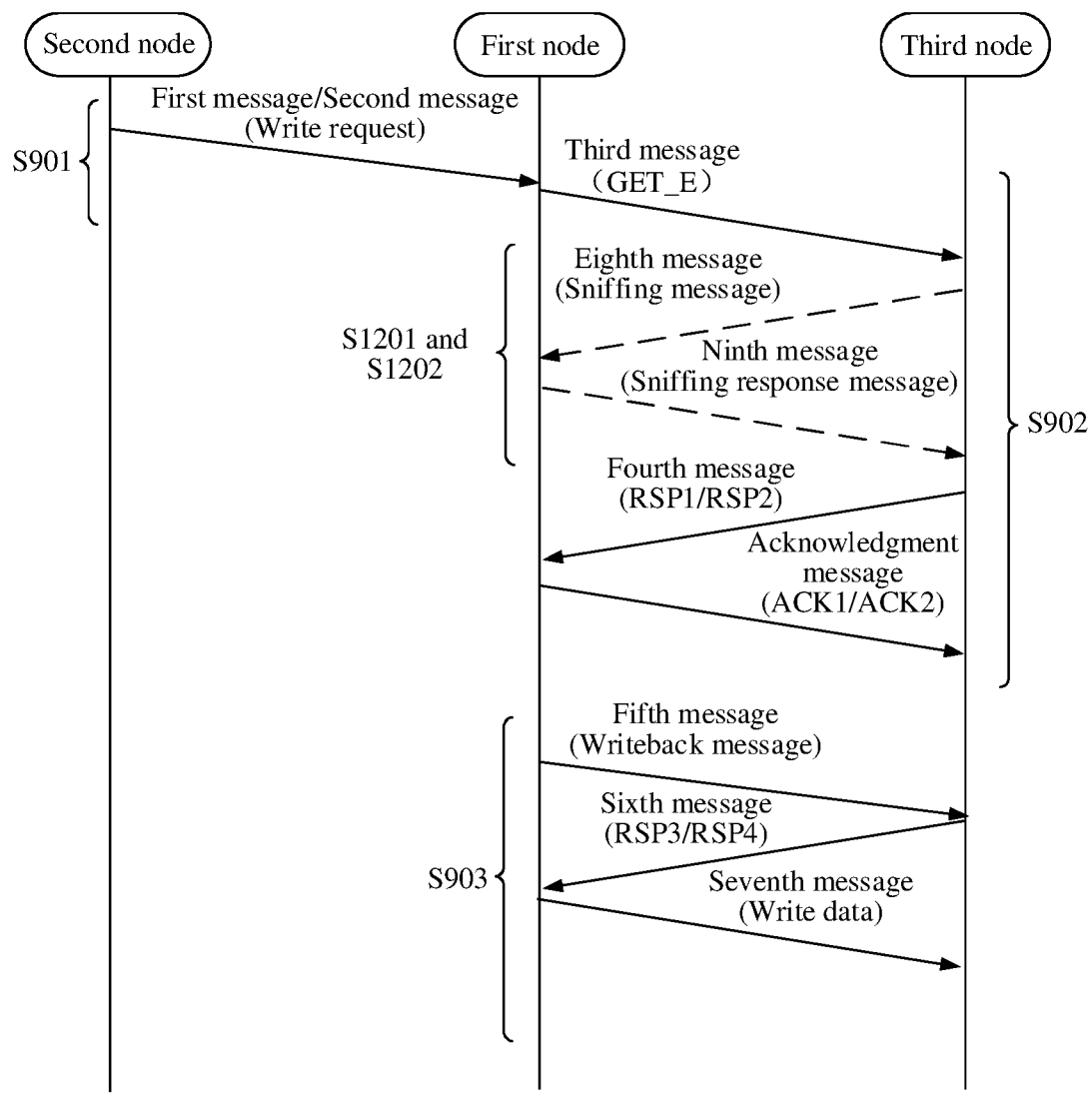
FIG. 13 is a schematic flowchart 5 of a read/write operation execution method according to an embodiment of this application.

For example, as shown in FIG. 13, before the third node sends a response message (RSP1) of a third message 1 (GET_E1) to the first node so that the first node obtains the operation permission of the first address (or the second address), the third node sends the eighth message (sniffing message) to the first node, so that the first node receives the eighth message from the third node, where the eighth message is for requesting to perform the read/write operation that requires the operation permission on the first address (or the second address), or is for requesting the operation permission of the first address (or the second address).

S1202: The first node sends a ninth message to the third node.

The ninth message indicates that the operation permission of the first address (or the second address) is not obtained. The ninth message may be a response message of the eighth message. For example, the ninth message may be a sniffing response message.

For example, as shown in FIG. 13, the first node sends the ninth message (sniffing response message) to the third node, where the eighth message indicates that the operation permission of the first address (or the second address) is not obtained.

In this implementation, before the first node obtains the operation permission of the first address, if the third node requests to perform a read/write operation that requires the operation permission on the first address, or requests the operation permission of the first address, the first node indicates to the third node that the operation permission of the first address is not obtained, so that the third node or another node can perform a read/write operation on the first address. Similarly, before the first node obtains the operation permission of the second address, if the third node requests, to perform a read/write operation that requires the operation permission on the second address, or requests the operation permission of the second address, the first node indicates to the third node that the operation permission of the second address is not obtained, so that the third node or another node can perform a read/write operation on the second address.

Figure 14:
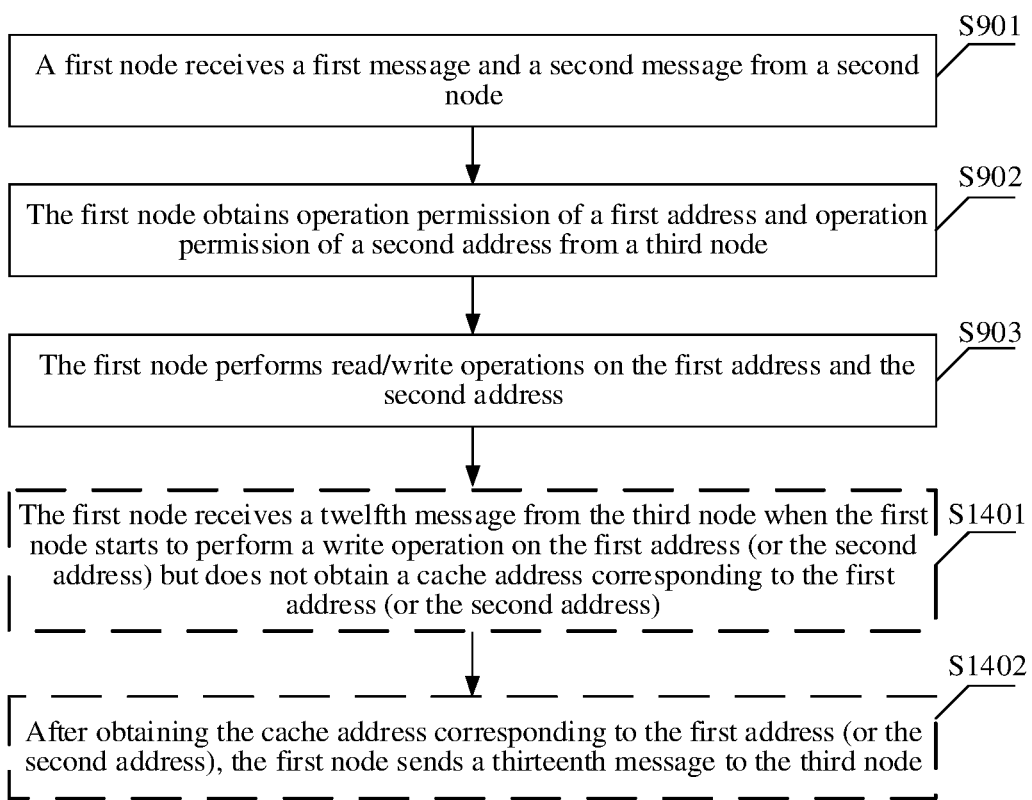
FIG. 14 is a schematic flowchart 6 of a read/write operation execution method according to an embodiment of this application.

In another possible implementation, before the first node starts to perform a write operation on the first address but obtains a cache address corresponding to the first address, if the third node requests to perform a read/write operation that requires operation permission on the first address, or requests operation permission of the first address, after obtaining the cache address corresponding to the first address, the first node sends, to the third node, data written into the cache address corresponding to the first address, or indicates that the operation permission of the first address has been released. Similarly, before the first node starts to perform a write operation on the second address but obtains a cache address corresponding to the second address, if the third node requests to perform a read/write operation that requires operation permission on the second address, or requests operation permission of the second address, after obtaining the cache address corresponding to the second address, the first node sends, to the third node, data written into the cache address corresponding to the second address, or indicates that the operation permission of the second address has been released. As shown in FIG. 14, the foregoing read/write operation execution method further includes the following steps.

S1401: The first node receives a twelfth message from the third node when the first node starts to perform a write operation on the first address (or the second address) but does not obtain the cache address corresponding to the first address (or the second address).

The twelfth message is for requesting to perform a read/write operation that requires the operation permission on the first address (or the second address), or is for requesting the operation permission of the first address (or the second address). For example, the twelfth message may be a sniffing (snoop) message.

Figure 15:
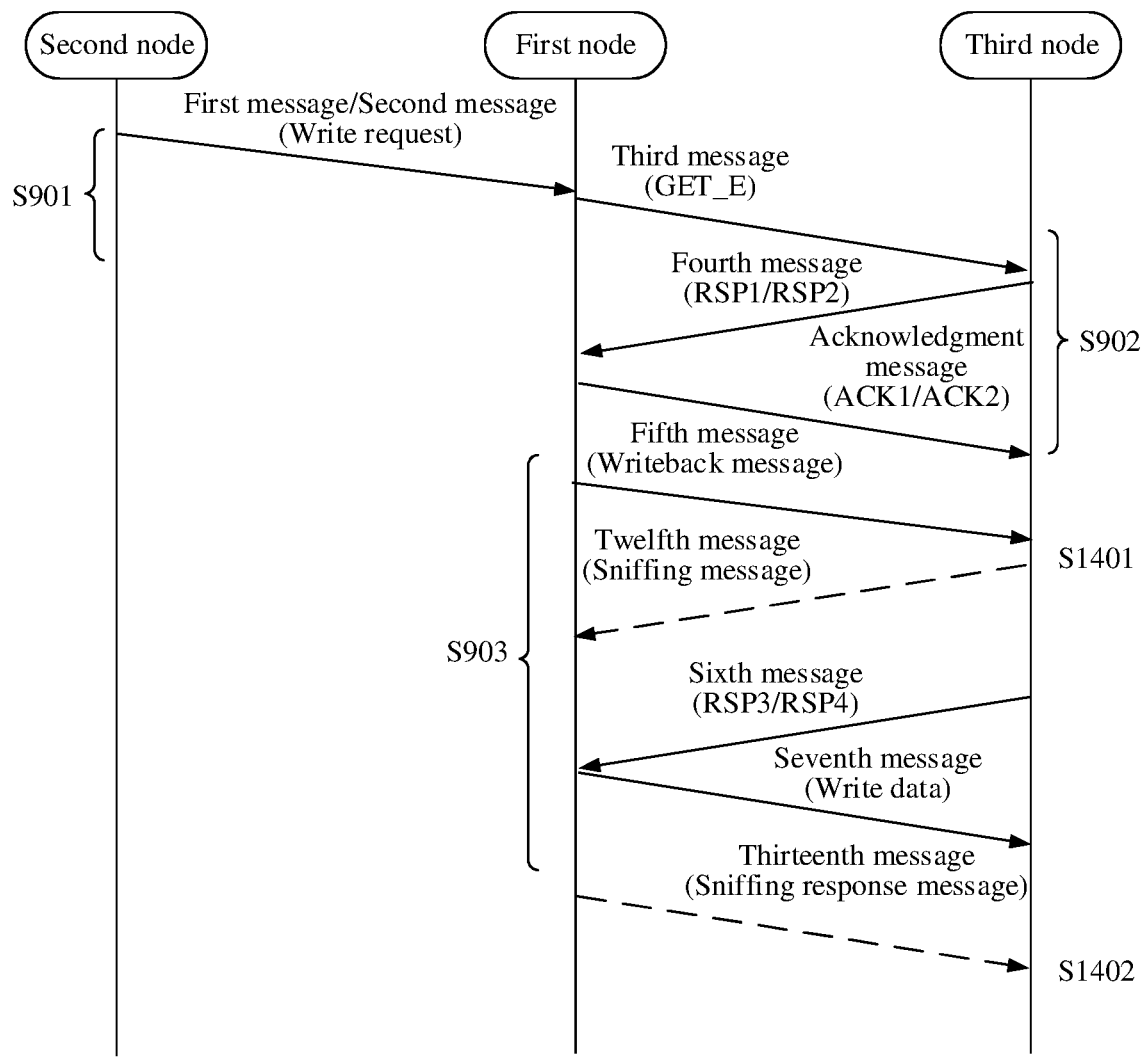
FIG. 15 is a schematic flowchart 7 of a read/write operation execution method according to an embodiment of this application.

For example, as shown in FIG. 15, before the third node sends a sixth message (including the cache address corresponding to the first address (or the second address)) to the first node, the third node sends a twelfth message (sniffing message) to the first node, so that the first node receives the twelfth message from the third node, where the twelfth message is for requesting to perform a read/write operation that requires the operation permission on the first address (or the second address), or is for requesting the operation permission of the first address (or the second address).

S1402: After obtaining the cache address corresponding to the first address (or the second address), the first node sends a thirteenth message to the third node.

For example, as shown in FIG. 15, after receiving a sixth message 1 (including the cache address corresponding to the first address (or the second address)) from the first node, the first node sends a thirteenth message to the third node. The thirteenth message may be a response message of the twelfth message. For example, the thirteenth message may be a sniffing response message.

In a possible implementation, the thirteenth message may include data written into the cache address corresponding to the first address (or the second address). The thirteenth message may have a function of the seventh message to replace the seventh message. To be specific, the thirteenth message may further indicate to release the operation permission of the first address (or the second address) to the third node.

In another possible implementation, the thirteenth message may be sent after the seventh message (where in this case, the seventh message indicates to release the operation permission of the first address (or the second address) to the third node), and indicates that the operation permission of the first address (or the second address) has been released.

In the implementations shown in FIG. 14 and FIG. 15, when the third node requests, before the first node starts to perform the write operation on the first address but obtains the cache address corresponding to the first address, to perform the read/write operation that requires the operation permission on the first address, or requests the operation permission of the first address, after obtaining the cache address corresponding to the first address, the first node sends, to the third node, the data written into the cache address corresponding to the first address, or indicates that the operation permission of the first address has been released. In this case, after obtaining the cache address corresponding to the first address, the first node sends, to the third node, the data written into the cache address corresponding to the first address, so that the third node can directly obtain the data; or after sending the seventh message, the first node indicates that the operation permission of the first address has been released, so that the third node or another node can perform a read/write operation on the first address.

Similarly, when the third node requests, before the first node starts to perform the write operation on the second address but obtains the cache address corresponding to the second address, to perform the read/write operation that requires the operation permission on the second address, or requests the operation permission of the second address, after obtaining the cache address corresponding to the second address, the first node sends, to the third node, the data written into the cache address corresponding to the second address, or indicates that the operation permission of the second address has been released. After obtaining the cache address corresponding to the second address, the first node sends, to the third node, the data written into the cache address corresponding to the second address, so that the third node can directly obtain the data; or after sending the seventh message, the first node indicates that the operation permission of the second address has been released, so that the third node or another node can perform a read/write operation on the second address.

After the first node obtains the operation permission of the first address and the operation permission of the second address from the third node, when a preset condition is met, the first node may release the operation permission of the first address and the operation permission of the second address to the third node, so that the third node or another node can perform read/write operations on the first address and the second address.

In a possible implementation, the preset condition is that the third node requests the operation permission of the first address and the second address.

Figure 16:
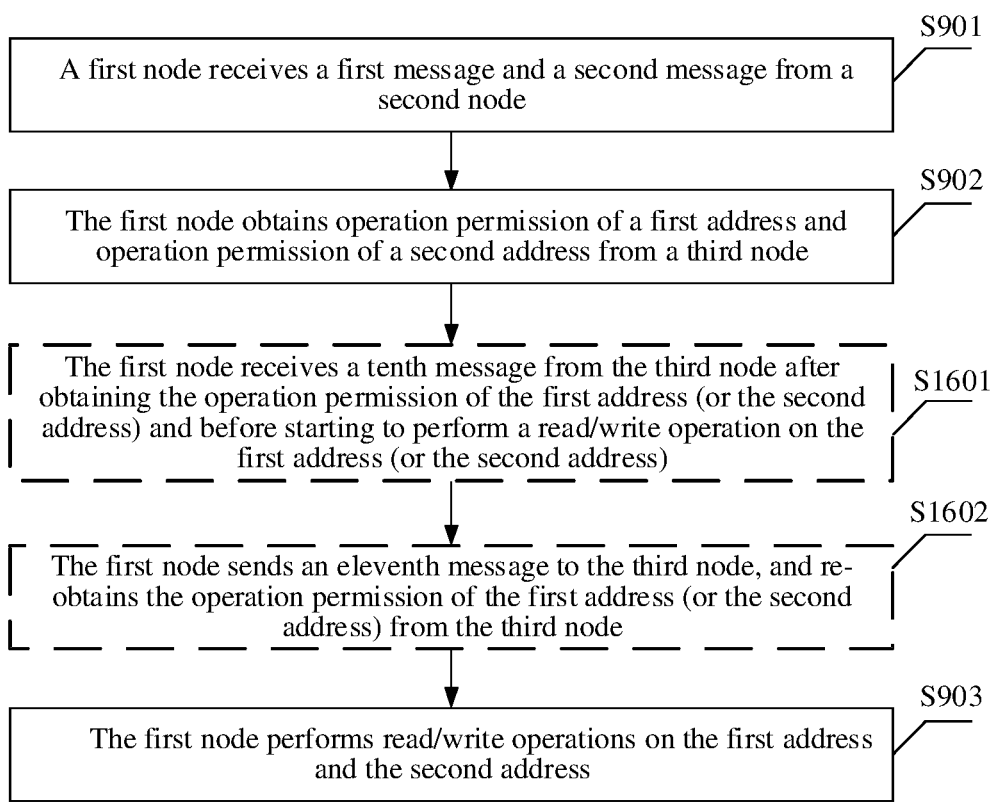
FIG. 16 is a schematic flowchart 8 of a read/write operation execution method according to an embodiment of this application.

For example, when the third node requests, after the first node obtains the operation permission of the first address and before the first node starts to perform the read/write operation on the first address, to perform the read/write operation that requires the operation permission on the first address, or requests the operation permission of the first address, the first node releases the operation permission of the first address to the third node, and re-obtains the operation permission of the first address from the third node. Similarly, when the third node requests, after the first node obtains the operation permission of the second address and before the first node starts to perform the read/write operation on the second address, to perform the read/write operation that requires the operation permission on the second address, or requests the operation permission of the second address, the first node releases the operation permission of the second address to the third node, and re-obtains the operation permission of the second address from the third node. As shown in FIG. 16, the foregoing read/write operation execution method further includes the following steps.

S1601: The first node receives a tenth message from the third node after obtaining the operation permission of the first address (or the second address) and before starting to perform a read/write operation on the first address (or the second address).

The tenth message is for requesting to perform a read/write operation that requires the operation permission on the first address (or the second address), or is for request the operation permission of the first address (or the second address). For example, the tenth message may be a sniffing (snoop) message.

Figure 17:
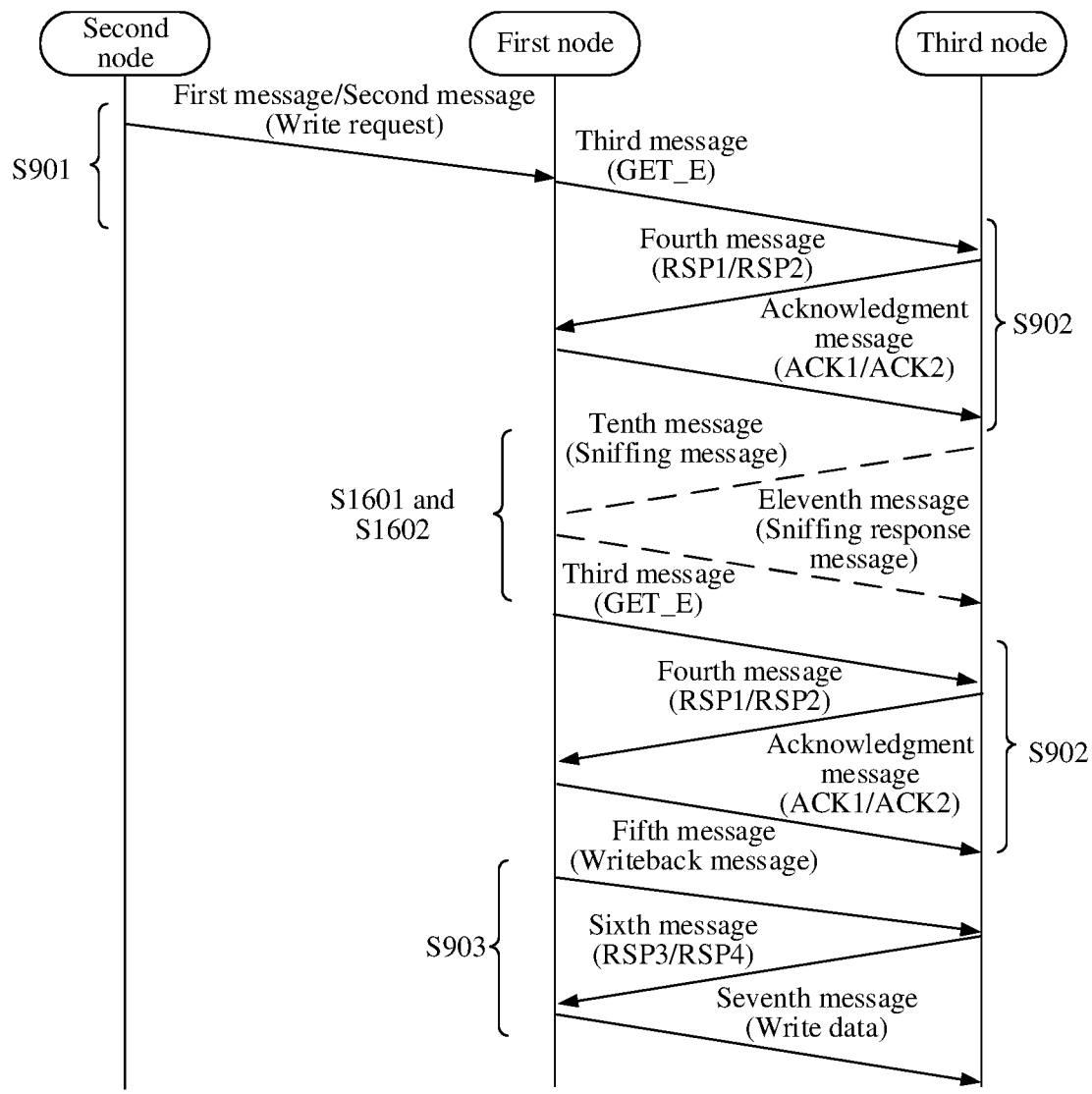
FIG. 17 is a schematic flowchart 9 of a read/write operation execution method according to an embodiment of this application.

For example, as shown in FIG. 17, before the first node sends a fourth message 1 to the third node, the third node sends a tenth message (sniffing message) to the first node, so that the first node receives the tenth message from the third node, where the tenth message is for requesting to perform a read/write operation that requires the operation permission on the first address (or the second address), or is for requesting the operation permission of the first address (or the second address).

S1602: The first node sends an eleventh message to the third node, and re-obtains the operation permission of the first address (or the second address) from the third node.

The eleventh message indicates to release the operation permission of the first address (or the second address). The eleventh message may be a response message of the tenth message. For example, the eleventh message may be a sniffing response message.

For example, as shown in FIG. 17, the first node sends the eleventh message (sniffing response message) to the third node, where the eleventh message indicates to release the operation permission of the first address (or the second address), sends a third message (GET_E) to the third node again, receives a fourth message (RSP1/RSP2) from the third node to obtain the operation permission of the first address (or the second address), and sends an acknowledgment message (ACK1) of the fourth message to the third node. Then, the first node re-executes a process of the read/write operation on the first address (or the second address) and a process of releasing the operation permission of the first address (or the second address).

In this implementation, when the third node requests, after the first node obtains the operation permission of the first address and before the first node starts to perform the read/write operation on the first address, to perform the read/write operation that requires the operation permission on the first address, or requests the operation permission of the first address, the first node releases the operation permission of the first address to the third node, and re-obtains the operation permission of the first address from the third node. After the first node releases the operation permission of the first address to the third node, the third node can directly perform the read/write operation on the first address. When re-obtaining the operation permission of the first address from the third node, the first node may continue to perform the read/write operation on the first address.

Similarly, when the third node requests, after the first node obtains the operation permission of the second address and before the first node starts to perform the read/write operation on the second address, to perform the read/write operation that requires the operation permission on the second address, or requests the operation permission of the second address, the first node releases the operation permission of the second address to the third node, and re-obtains the operation permission of the second address from the third node. After the first node releases the operation permission of the second address to the third node, the third node can directly perform the read/write operation on the second address. When re-obtaining the operation permission of the second address from the third node, the first node may continue to perform the read/write operation on the second address.

In another possible implementation, a preset condition is that a time period for obtaining the operation permission of the first address by the first node from the third node is longer than or equal to a first preset time period, and a time period for obtaining the operation permission of the second address by the first node from the third node is longer than or equal to a second preset time period. The first preset time period and the second preset time period may be the same or different.

As described above, there is no execution sequence between steps S901 and S902. If step S902 is performed before step S901, or to be specific, the first node pre-obtains the operation permission of the first address (or the second address), when receiving the first message (or the second message), the first node may quickly perform a read/write operation on the first address (or the second address). The first node may obtain the operation permission of the first address (or the second address) in advance based on a historical read/write operation.

If the first message is not received within the preset time period after the first node obtains the operation permission of the first address from the third node, the first node releases the operation permission of the first address to the third node. Similarly, if the second message is not received within the preset time period after the first node obtains the operation permission of the second address from the third node, the first node releases the operation permission of the second address to the third node.

Figure 18:
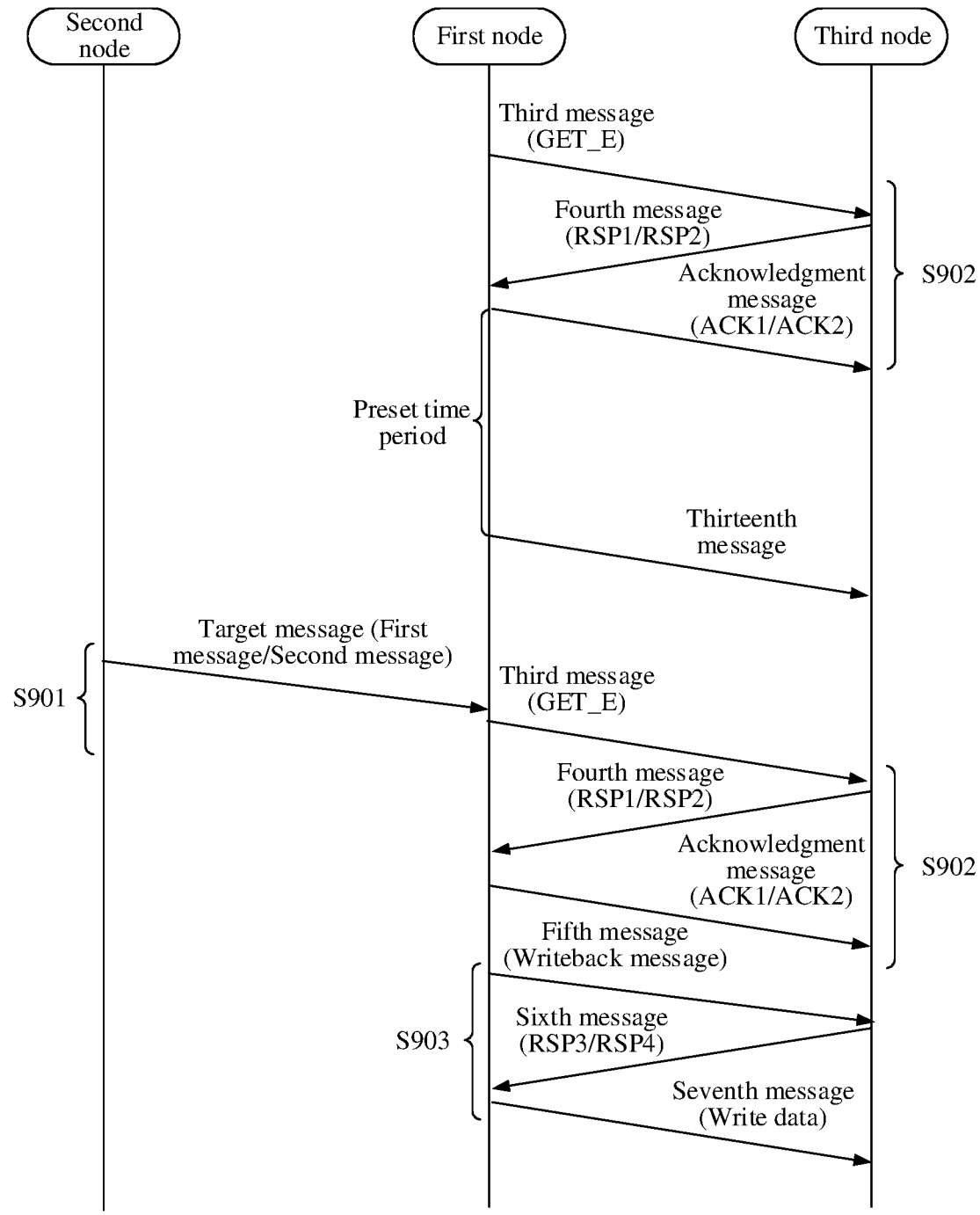
FIG. 18 is a schematic flowchart 10 of a read/write operation execution method according to an embodiment of this application.

For example, as shown in FIG. 18, if the first node does not receive the first message (or the second message) within a preset time period after obtaining operation permission of the first address (or the second address) through the third message and the fourth message, the first node sends a fourteenth message to the third node to indicate to release the operation permission of the first address (or the second address). When receiving the first message (or the second message) again, the first node re-executes the interaction process corresponding to the foregoing steps S902 and S903, to complete the read/write operation.

Figure 19:
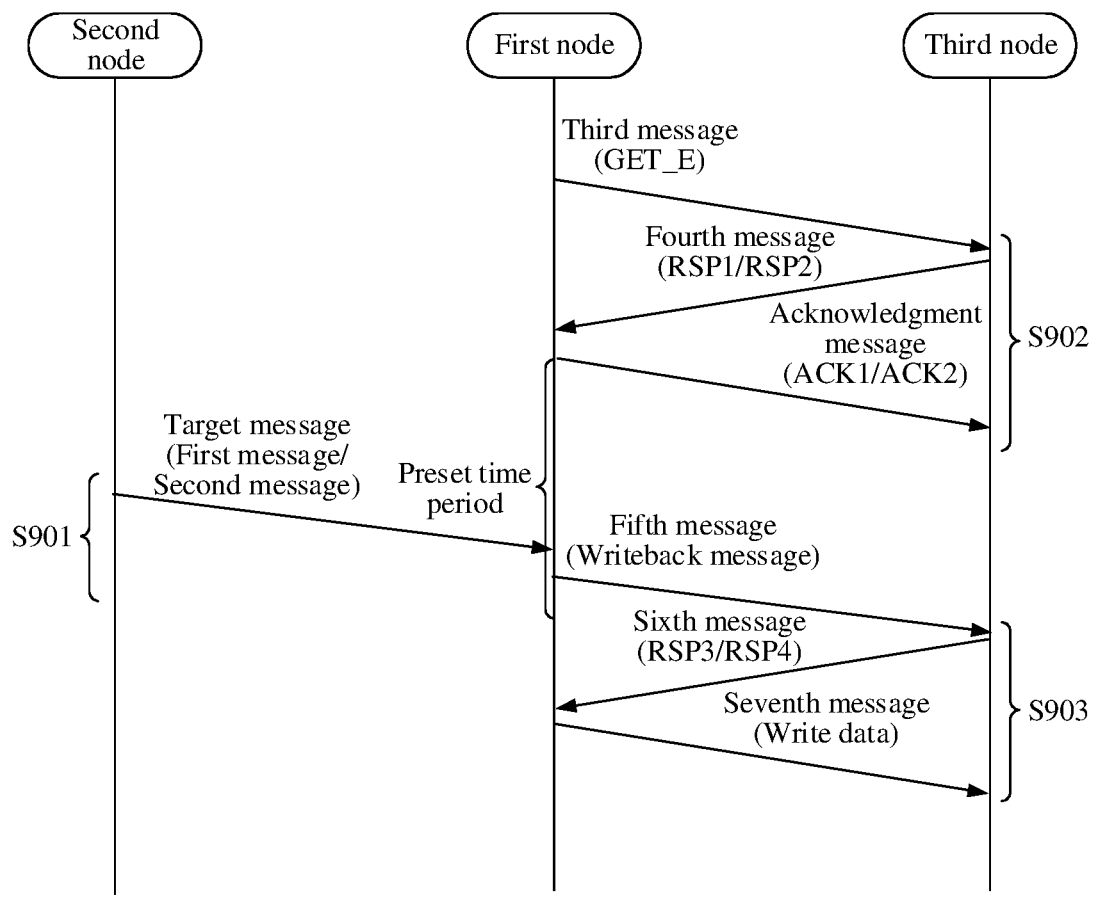
FIG. 19 is a schematic flowchart 11 of a read/write operation execution method according to an embodiment of this application.

For example, as shown in FIG. 19, if the first node receives the first message (or the second message) within the preset time period after obtaining the operation permission of the first address (or the second address) through the third message and the fourth message, the first node performs the interaction process corresponding to step S903, to complete the read/write operation.

In this implementation, after receiving the read/write request from the second node, the first node does not need to perform a process of obtaining the operation permission, and can quickly perform the read/write operation on the first address (or the second address).

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond a scope of this application.

It may be clearly understood by a person skilled in the art that, for a purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit.

All or some of the foregoing embodiments may be implemented through software, hardware, firmware, or any combination thereof. When a software program is used to implement embodiments, the embodiments may be implemented all or partially in a form of a computer program product. The computer program product includes one or more computer instructions. When the computer program instructions are loaded and executed on a computer, the procedure or function according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a first node, a first message and a second message from a second node, wherein the first message requests performing a first read/write operation on a first address managed by a third node, wherein the second message requests performing a second read/write operation on a second address managed by the third node, and wherein the second node complies with a strict order (SO) constraint and the third node complies with a relax order (RO) constraint; and
   obtaining, by the first node, first operation permission of the first address and second operation permission of the second address from the third node; and
   performing, by the first node, the first and second read/write operations on the first address and the second address in a sequence of receiving the first message and the second message.

2. The method according to claim 1, wherein performing, by the first node, the first and second read/write operations on the first address and the second address comprises:
   performing, by the first node, the first and second read/write operations on the first address and the second address in parallel.

3. The method according to claim 2, wherein performing, by the first node, the first and second read/write operations on the first address and the second address in parallel comprises:
   performing, by the first node, the first and second read/write operations on the first address and the second address in parallel based on the sequence of receiving the first message and the second message.

4. The method according to claim 1, further comprising:
   releasing, by the first node, the first operation permission of the first address to the third node after completing the first read/write operation on the first address; and
   releasing, by the first node, the second operation permission of the second address to the third node after completing the second read/write operation on the second address.

5. The method according to claim 1, wherein obtaining, by the first node, the first operation permission of the first address and the second operation permission of the second address from the third node comprises:
   obtaining, by the first node, a first E (Exclusive) state of the first address and a second E (Exclusive) state of the second address from the third node.

6. The method according to claim 1, further comprising:
   when the first node requests the first operation permission of the first address but does not obtain the first operation permission of the first address, when the first node receives that the third node requests to perform a read/write operation that requires the first operation permission on the first address or that the third node requests the first operation permission of the first address, indicating, by the first node, to the third node that the first operation permission of the first address is not obtained; and
   when the first node requests the second operation permission of the second address but does not obtain the second operation permission of the second address, when the first node receives that the third node requests to perform a read/write operation that requires the second operation permission on the second address or that the third node requests the second operation permission of the second address, indicating, by the first node, to the third node that the second operation permission of the second address is not obtained.

7. The method according to claim 1, wherein after obtaining, by the first node, the first operation permission of the first address and the second operation permission of the second address from the third node, the method further comprises:
when a preset condition is met, releasing, by the first node, the first operation permission of the first address and the second operation permission of the second address to the third node.

8. The method according to claim 7, wherein the preset condition is that the third node requests the first and second operation permissions of the first address and the second address.

9. The method according to claim 7, wherein the preset condition is that a time period for obtaining the first operation permission of the first address by the first node from the third node is longer than or equal to a first preset time period, and a time period for obtaining the second operation permission of the second address by the first node from the third node is longer than or equal to a second preset time period.

10. A chip, comprising:
a first node; and
a memory controller;
wherein the first node is configured to:
receive a first message and a second message from a second node, wherein the first message requests performing a first read/write operation on a first address managed by the memory controller, wherein the second message requests performing a second read/write operation on a second address managed by the memory controller, wherein the second node complies with a strict order (SO) constraint and the memory controller complies with a relax order (RO) constraint;
obtain a first operation permission of the first address and a second operation permission of the second address from the memory controller; and
perform the first and second read/write operations on the first address and the second address in a sequence of receiving the first message and the second message.

11. The chip according to claim 10, wherein the first node is specifically configured to:
perform the first and second read/write operations on the first address and the second address in parallel.

12. The chip according to claim 11, wherein the first node is specifically configured to:
perform the first and second read/write operations on the first address and the second address in parallel based on the sequence of receiving the first message and the second message.

13. The chip according to claim 10, wherein the first node is further configured to:
release the first operation permission of the first address to the memory controller after completing the first read/write operation on the first address; and
release the second operation permission of the second address to the memory controller after completing the second read/write operation on the second address.

14. The chip according to claim 10, wherein the first node is specifically configured to:
obtain a first E (Exclusive) state of the first address and a second E (Exclusive) state of the second address from the memory controller.

15. The chip according to claim 10, wherein the first node is further configured to:
when the first node requests the first operation permission of the first address but does not obtain the first operation permission of the first address, when the first node receives that the memory controller requests to perform a read/write operation that requires the first operation permission on the first address or that the memory controller requests the first operation permission of the first address, indicate to the memory controller that the first operation permission of the first address is not obtained; and
when the first node requests the second operation permission of the second address but does not obtain the second operation permission of the second address, when the first node receives that the memory controller requests to perform a read/write operation that requires the second operation permission on the second address or that the memory controller requests the second operation permission of the second address, indicate to the memory controller that the second operation permission of the second address is not obtained.

16. The chip according to claim 10, wherein after obtaining the first operation permission of the first address and the second operation permission of the second address from the memory controller, the first node is further configured to:
when a preset condition is met, release the first operation permission of the first address and the second operation permission of the second address to the memory controller.

17. The chip according to claim 16, wherein the preset condition is that the memory controller requests the first and second operation permissions of the first address and the second address.

18. The chip according to claim 17, wherein the preset condition is that a time period for obtaining the first operation permission of the first address by the first node from the memory controller is longer than or equal to a first preset time period, and a time period for obtaining the second operation permission of the second address by the first node from the memory controller is longer than or equal to a second preset time period.

* * * * *